United States Patent

Wafford et al.

[11] Patent Number: 5,106,075
[45] Date of Patent: * Apr. 21, 1992

[54] FABRIC TURNER

[75] Inventors: Lawrence Wafford, Mesquite; Richard L. Harrington, Farmersville; Hubert Blessing, Dallas; Ted M. Ray, McKinney, all of Tex.

[73] Assignee: Levi Strauss & Co., San Francisco, Calif.

[*] Notice: The portion of the term of this patent subsequent to Nov. 6, 2007 has been disclaimed.

[21] Appl. No.: 570,428

[22] Filed: Aug. 21, 1990

Related U.S. Application Data

[63] Continuation-in-part of Ser. No. 333,702, Apr. 4, 1989, Pat. No. 4,968,021.

[51] Int. Cl.⁵ .............................................. B65H 29/00
[52] U.S. Cl. ............................... 271/186; 198/374; 198/395; 198/399; 198/403; 271/304
[58] Field of Search ............... 198/374, 395, 399, 403, 198/410, 624; 271/186, 304

[56] References Cited

U.S. PATENT DOCUMENTS

| 2,754,953 | 7/1956 | Groncy | 198/624 |
| 4,078,789 | 3/1978 | Kittredge et al. | 271/186 |
| 4,346,880 | 8/1982 | Roller et al. | 271/186 |
| 4,359,217 | 11/1982 | Roller et al. | 271/186 |
| 4,673,176 | 6/1987 | Schenk | 271/186 |
| 4,699,367 | 10/1987 | Russel | 271/186 |
| 4,799,613 | 1/1989 | Adamson | 198/395 |
| 4,968,021 | 11/1990 | Wafford et al. | 198/374 |

FOREIGN PATENT DOCUMENTS

| 2438811 | 2/1976 | Fed. Rep. of Germany | 198/374 |
| 75392 | 5/1982 | Japan | 271/186 |

OTHER PUBLICATIONS

Xerox Disclosure Journal, vol. 6 #4, Jul. 8, 1981, p. 179.

Primary Examiner—Joseph E. Valenza
Attorney, Agent, or Firm—Limbach & Limbach

[57] ABSTRACT

An apparatus is disclosed for selectively inverting flexible and limp planar workpieces such as fabric. The apparatus includes a primary workpiece propeller having a cylindrical means for contacting the workpiece about a central rotating axis. A slot of sufficient size to receive the workpiece is positioned in a substantially vertical orientation beneath the primary propeller. The slot preferably has a flared upper end positioned directly beneath and in contact or near contact with the propeller. The fabric is drawn into the slot by the rotation of the propeller and follows the contour of the flared open end of the slot. The fabric enters into the slot until the trailing edge of the fabric is in contact with the primary propeller. The trailing edge of the fabric is drawn by the propeller to the opposite side of the flared opening of the slot and is subsequently pulled out of the slot. Collisions are prevented between workpieces by a control circuit that instructs the workpieces when to leave the apparatus.

18 Claims, 20 Drawing Sheets

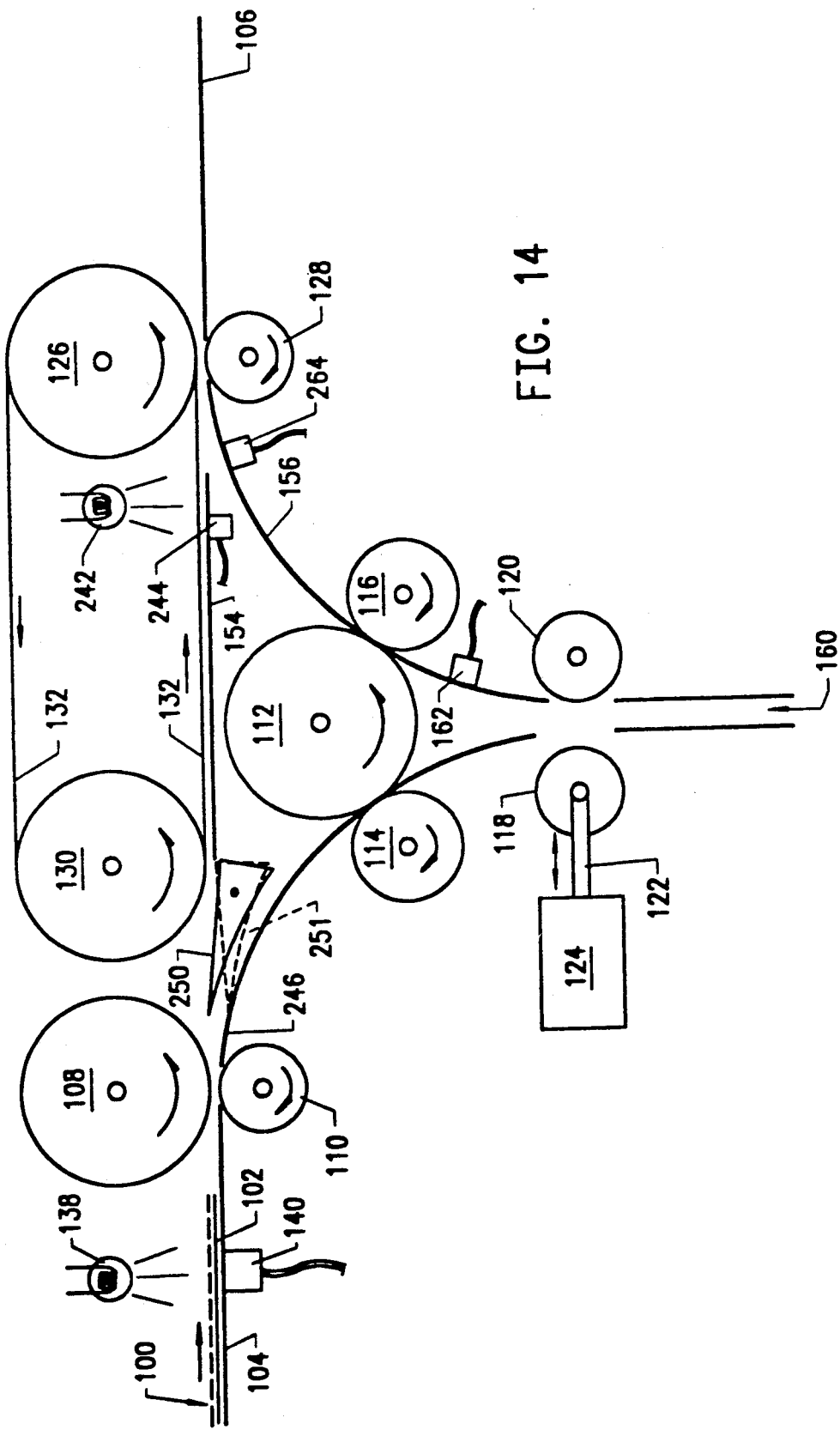

FABRIC TURNER

This case is a continuation-in-part of U.S. patent application Ser. No. 333.702 now U.S. Pat. No. 4,968,021 which was filed on Apr. 4, 1989 and was issued on Nov. 6, 1990.

FIELD OF THE INVENTION

This invention relates to the field of automated handling of flexible limp planar objects. More particularly, this invention relates to the field of automated fabric handlers with the specific purpose of turning a piece of fabric over so that the top side is down and vice versa.

BACKGROUND OF THE INVENTION

In the field of automated material handling, the handling of rigid and semi-rigid objects is understood and utilizes machinery to push, pull, grab or flip such objects. Flexible and limp objects, such as pieces of fabric, pose particularly onerous problems in the field of automated handling. Such objects may only be pulled. An attempt to push such an object will generally result in the object bunching up, folding over itself and ultimately camming the flow of the workpiece.

SUMMARY OF THE INVENTION

An apparatus is disclosed for flipping over flexible and limp planar workpieces such as fabric. The apparatus includes a primary workpiece propeller having a cylindrical means for contacting the workpiece about a central rotating axis. A slot of sufficient size to receive the workpiece is positioned in a vertical orientation beneath the primary propeller. The slot preferably has a flared upper end positioned directly beneath and in contact or near contact with the propeller. The fabric is drawn into the slot by the rotation of the propeller and follows the contour of the flared open end of the slot. The fabric enters into the slot until the trailing edge of the fabric is in contact with the primary propeller. The trailing edge of the fabric is gripped by the propeller and thereby drawn to the opposite side of the flared opening of the slot and is subsequently pulled out of the slot. The fabric has thereby been inverted so that the top surface of the fabric is now on the bottom.

BRIEF DESCRIPTION OF THE DRAWINGS

FIG. 14 through 26 show cross-sections of the preferred and fifth embodiment of the present invention through the various cycles of its operation.

DETAILED DESCRIPTION OF THE PREFERRED EMBODIMENT

Figure 1:
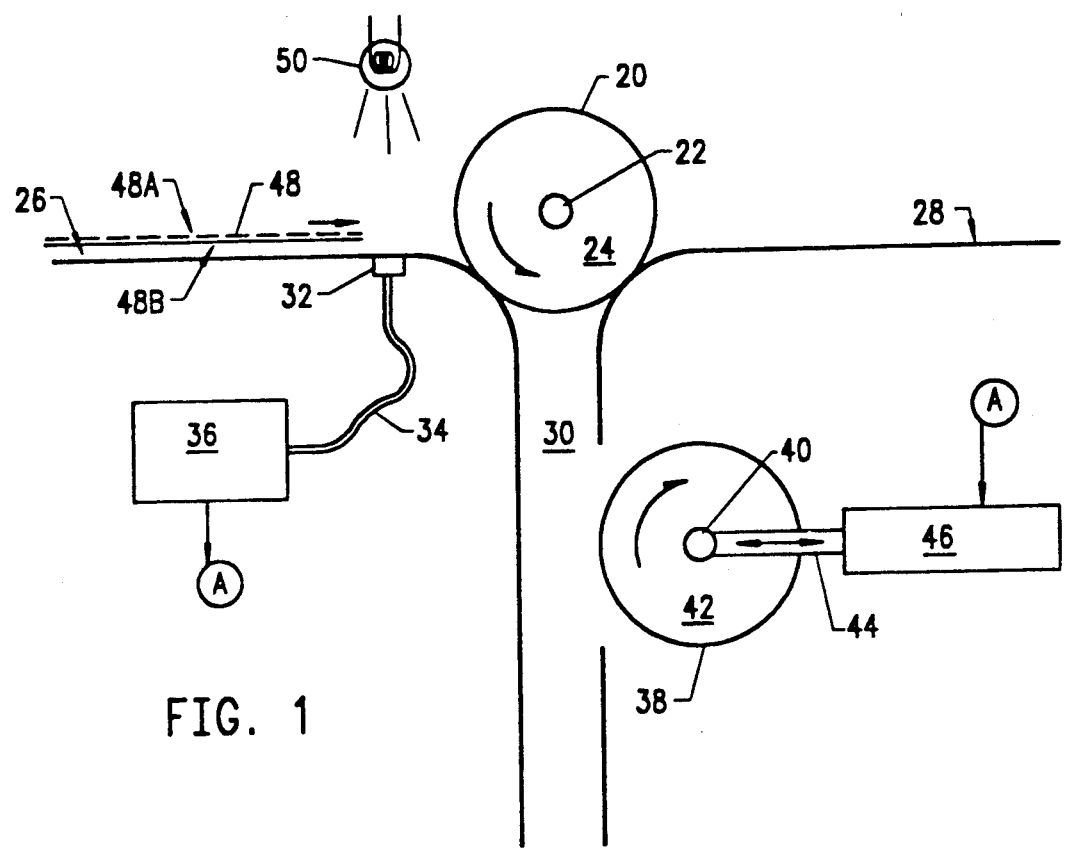
FIGS. 1 through 8 show a cross-section of an embodiment of the present invention through the various cycles of its operation.

FIG. 1 shows, in cross-section, the major components of the apparatus of an embodiment of the present invention. The primary propeller 20 consists of a central rotating shaft 22 on which a cylindrical rotating means is positioned for propelling a fabric workpiece. The rotating means 24 is preferably an annular brush or roller or a series of annular brushes or rollers positioned along the central axis 22 for engaging a piece of fabric 48.

The propeller 20 is positioned to come into contact or nearly in contact with the input tray 26. The input tray 26 may be formed of sheet metal or another planar surface along which the fabric 48 slides or is drawn by any convenient means prior to engaging the propeller 20. The output tray 28 is of similar construction to the input tray. The two trays each bend downward in a flared arcuate curve where the propeller 20 engages the input tray 26 and the output tray 28, and terminate at the top of the appropriate respective wall of the slot 30. The slot 30 is preferably formed between the two sheet metal portions. The slot 30 flares outwardly near its upper end where it contacts the propeller 20.

A fabric sensing device 32 is positioned in the input tray 26 in close proximity to the propeller 20 and is preferably a light sensor such as a photo sensitive diode. The fabric sensor 32 is coupled to an electronic control circuit 36 through wires 34.

A secondary propeller 38 is positioned along one side of the slot 30. When it is engaged with the fabric 48, the propeller 38 propels the fabric 48 upward. The propeller 38 includes a slideably mounted axle 40 around which is connected a brush or roller 42 similar to that for the primary propeller 24. The axle 40 is coupled at either end to a slideably controlled piston 44. The piston 44 is coupled to the air cylinder 46. The air cylinder 46 is controlled by the control signal A as shown.

In FIG. 1, a piece of fabric 48 is shown to be positioned on the input tray 26 and moving to the right. The top 48A of the fabric 48 is shown by a dotted line and the bottom 48B of the fabric 48 by a solid line. The movement to the right is shown by the arrow and may be generated by any convenient means. For example, there may be a conveyor belt or a propeller brush positioned over and contacting the input tray 26 thereby pulling the fabric 48 toward the primary propeller 20. A light source 50 is positioned over fabric sensor 32 and may be any commercially available light. The control circuitry 36 receives a signal from the fabric sensor 32 indicating that light is being received by fabric sensor 32.

Figure 2:
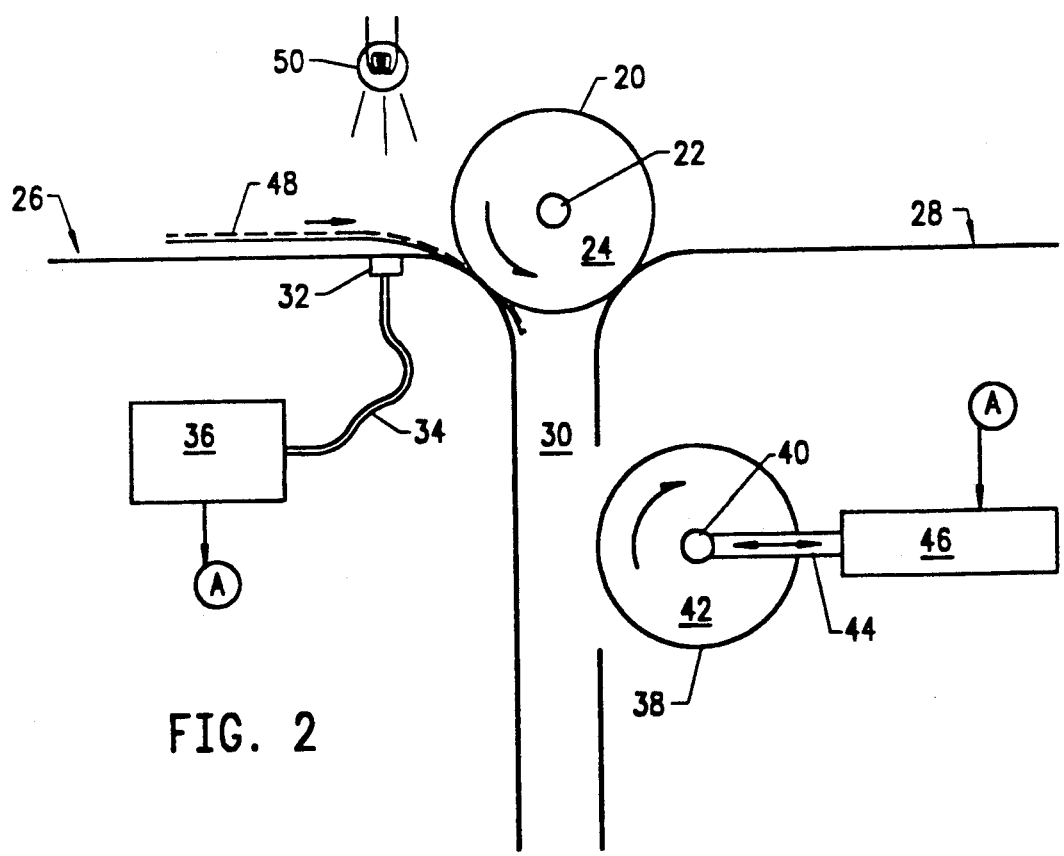

In FIG. 2, the fabric 48 is engaged by the primary propeller 20 and drawn into the slot 30. The fabric 48 also covers the fabric sensor 32. By covering the fabric sensor 32, the light from the light source 50 is prevented from reaching the fabric sensor 32. The control circuit 36 is thus conditioned to indicate that a piece of fabric is covering the fabric sensor 32 indicating that a workpiece is entering the apparatus.

Figure 3:
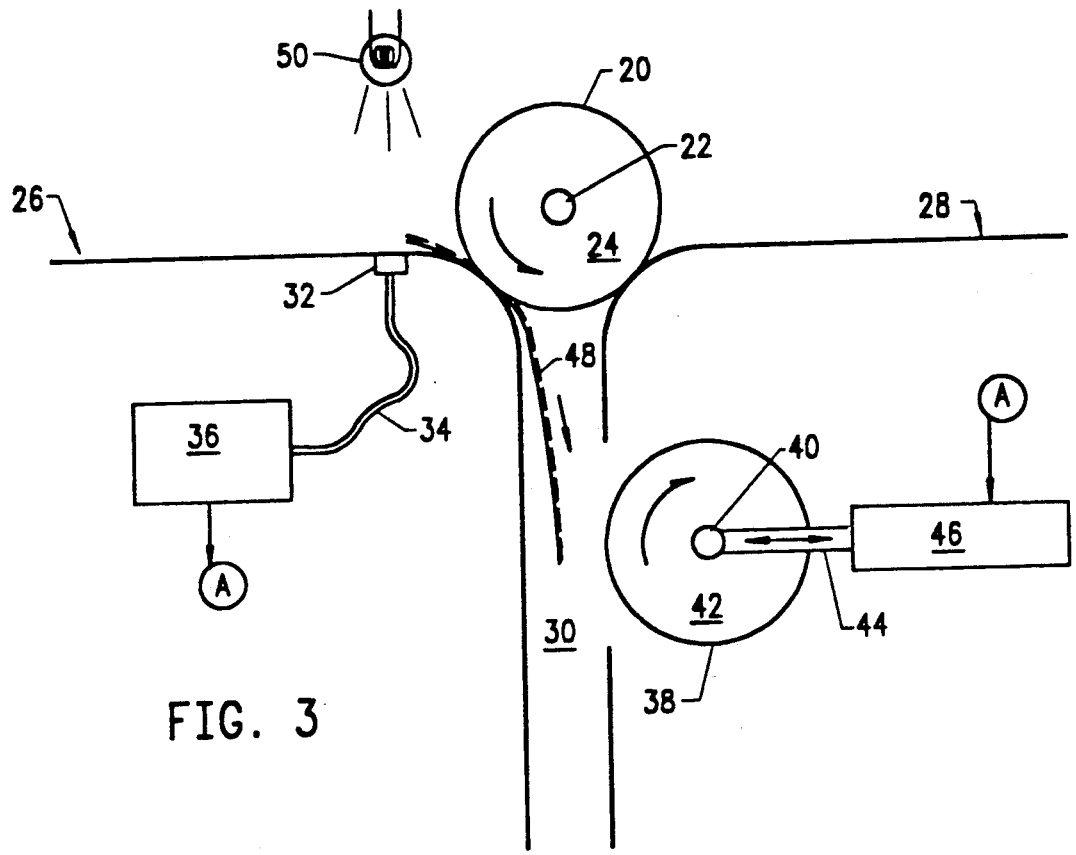

Referring to FIG. 3, the piece of fabric 48 passes beyond the fabric sensor 32. The propeller 20 continues to draw the fabric 48 off of the input tray 26 and into the slot 30. The fabric 48 has passed beyond the fabric sensor 32 allowing the light from light source 50 to once again reach the fabric sensor 32. Upon receiving indication that light is once more being received from fabric sensor 32 the control circuit 36, issues a signal A to control the air cylinder 46. The air cylinder 46 drives the piston 44 out of the air cylinder 46.

Figure 4:
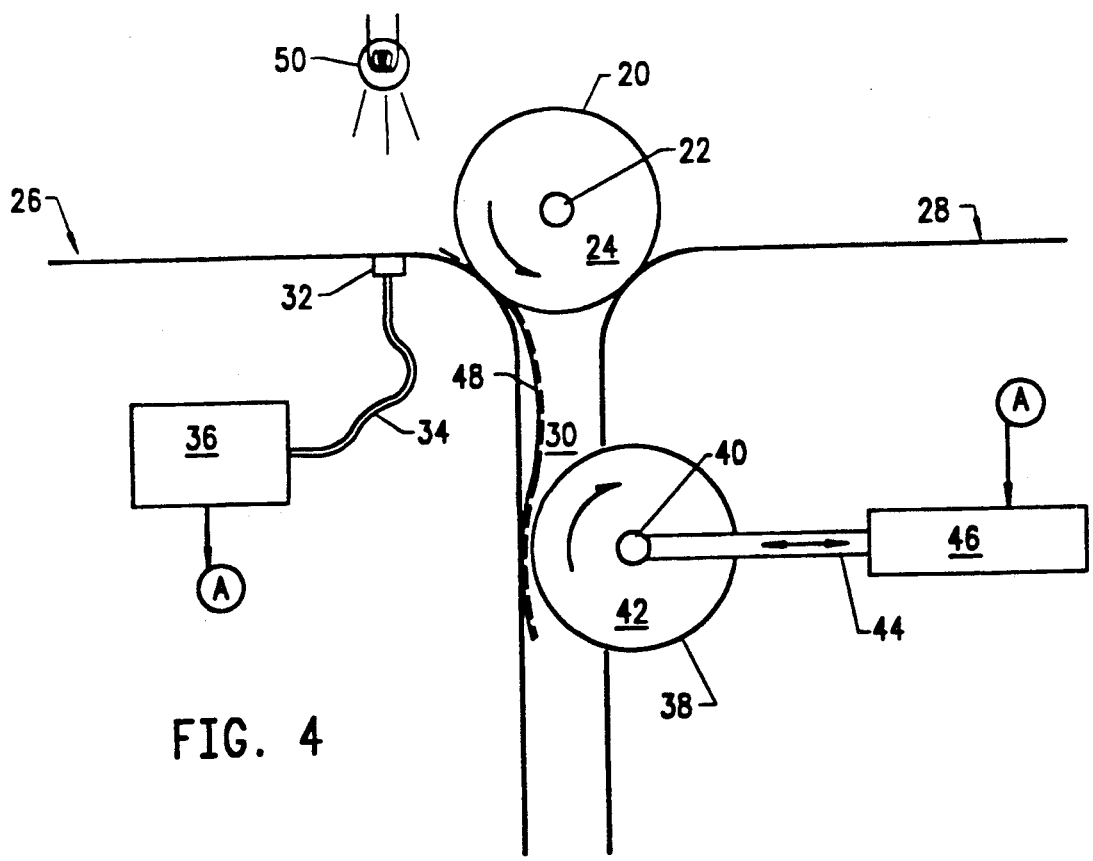

FIG. 4 shows that the motion of the piston 44 extends the secondary propeller 38 through an opening in one wall of the slot 30 and brings the secondary propeller 38 into contact with the fabric 48 to press the fabric 48 between the opposite wall of the slot 30 and the secondary propeller 38 and stops the downward motion of the fabric 48.

Figure 5:
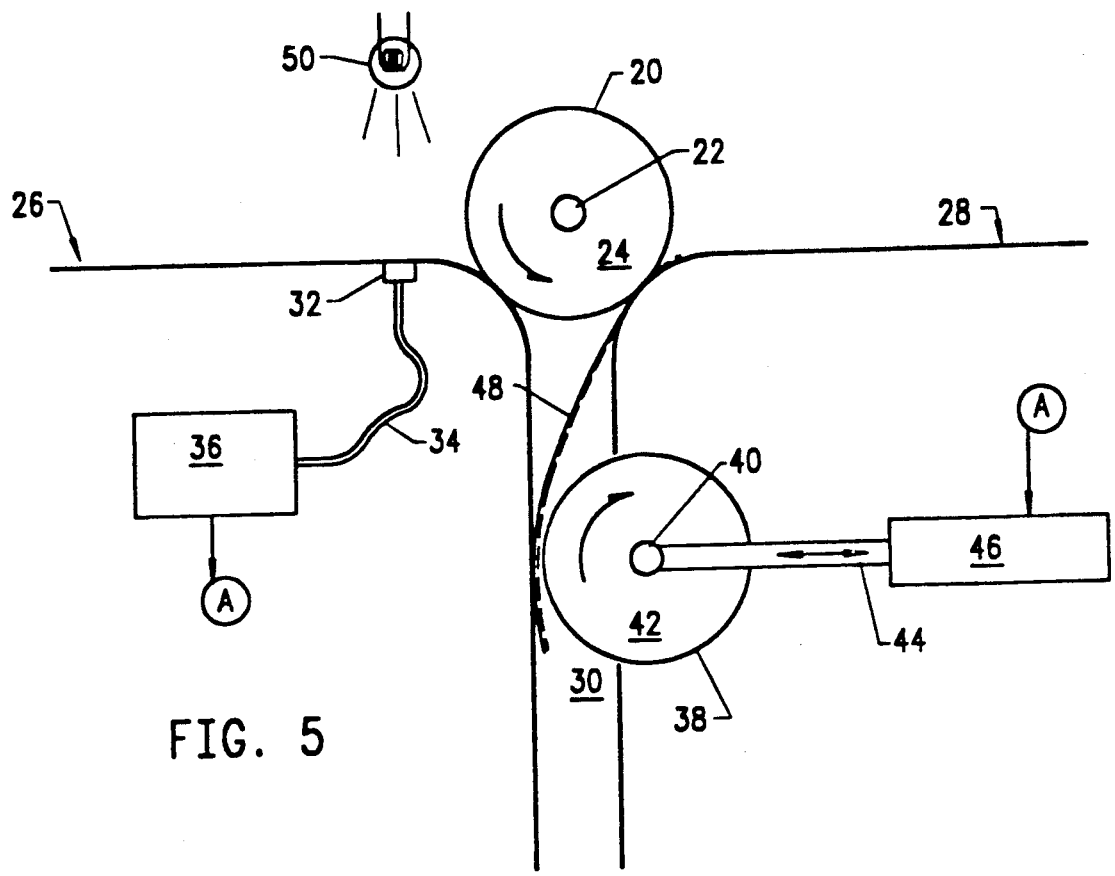

The trailing end of the upper face 48A of the fabric 48 is still in contact with the primary propeller 20 in FIG. 5. The primary propeller 20 causes the trailing end of the fabric 48 to flip from the input tray 26 and come into contact with the output tray 28. The rotation of the secondary propeller 38 prevents the fabric 48 from falling beyond the grasp and control of the primary propeller 20.

Figure 6:
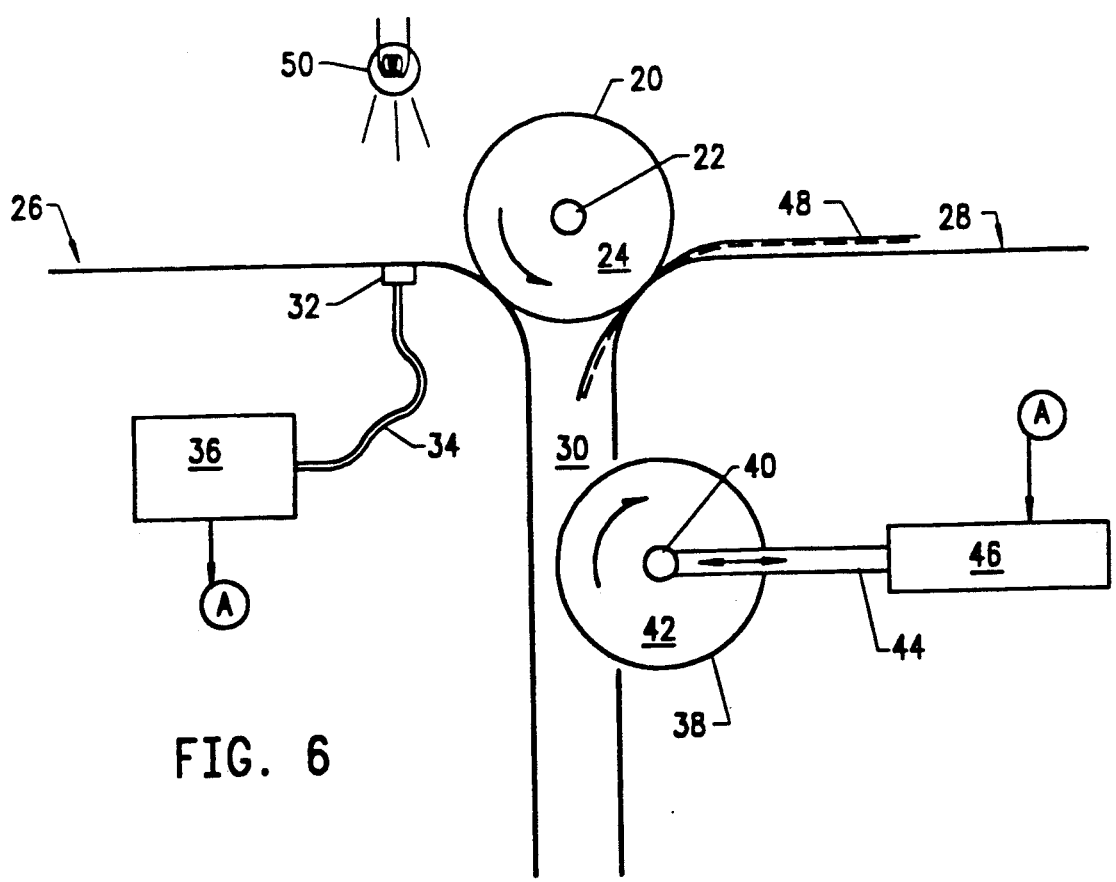

The secondary propeller 38 need not be rotating at the time it contacts the fabric. In some applications, workpieces may bunch up if the secondary propeller 38 drives the workpiece upward before the primary propeller 24 engages the fabric to draw it out of the slot 30. The rotation of the secondary propeller can be activated in response to the trailing edge of the fabric being prepared to exit the slot 30 to avoid this. FIG. 6 shows the primary propeller 20 and the secondary propeller 38 propelling the fabric 48, pulling it out of the slot 30 onto the exit tray 28.

Figure 7:
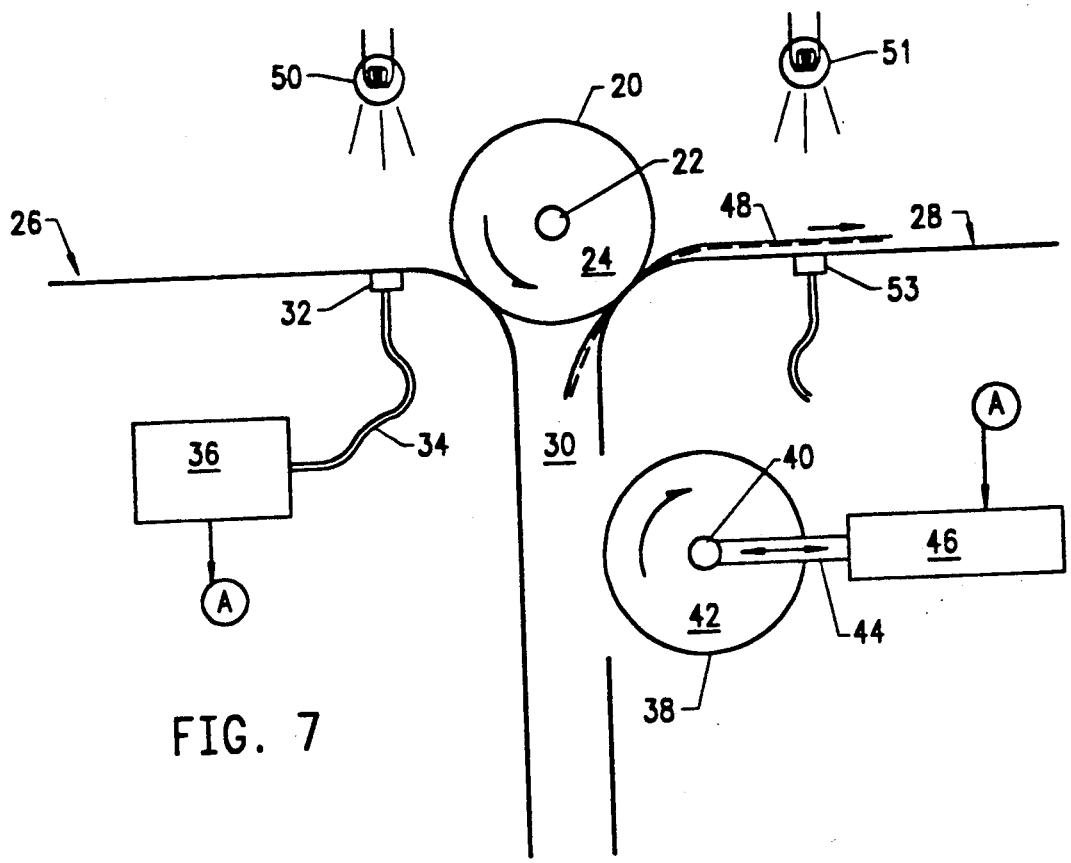

FIG. 7 shows that after the fabric 48 has left contact with the secondary propeller 38 that the primary propeller 20 continues to pull the fabric 48. In some applications a light 51 and photo sensor 53 can be positioned in the exit tray 28 to sense when the fabric has left the apparatus. This sensor may be coupled to control the turning of the primary propeller 24 and secondary propeller 38. The progress of the work piece can be stopped by deactivating the propellers until the work piece is required downstream.

Figure 8:
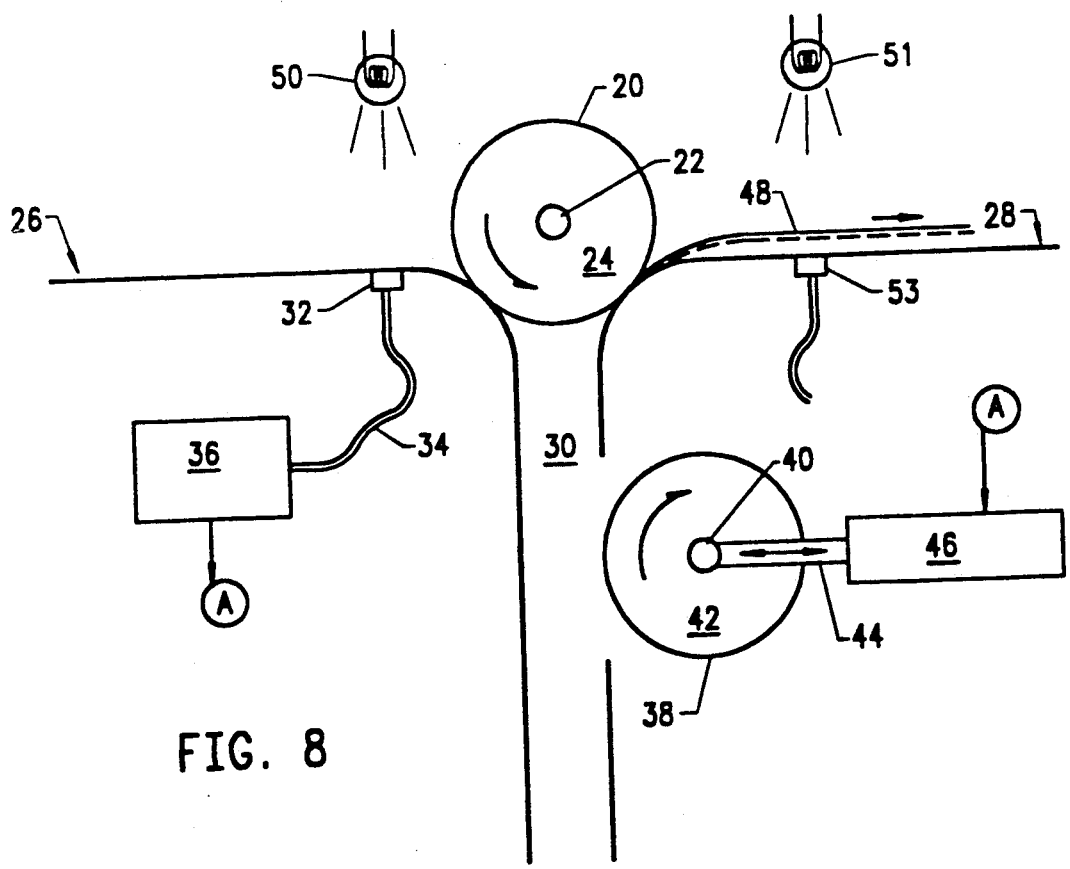

FIG. 8 shows that the fabric 48 has left contact with the primary propeller 20 to be removed from the exit tray 28 by any convenient means.

Figure 9:
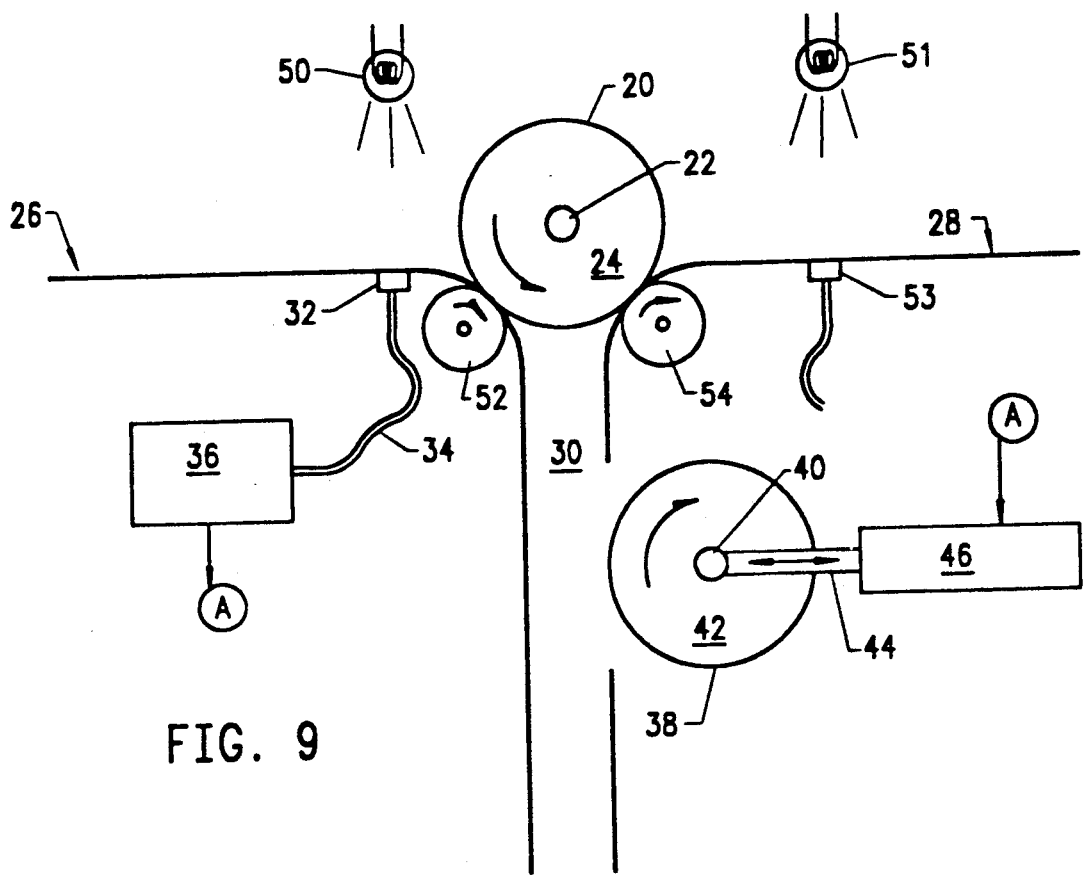
FIG. 9 shows a cross-section view of a first alternate embodiment of the present invention.

FIG. 9 shows a first alternate embodiment of the present invention. Rollers B and C are positioned in the arcuate curvatures formed between the input and output trays 26 and 28 and the slot 30. These rollers 52 and 54 may be free-rolling and turned by the fabric 48 moving across their surfaces. The rollers 52 and 54 may also be driven for example by a motor to enhance the moveability of the fabric into and out of slot 30.

Figure 10:
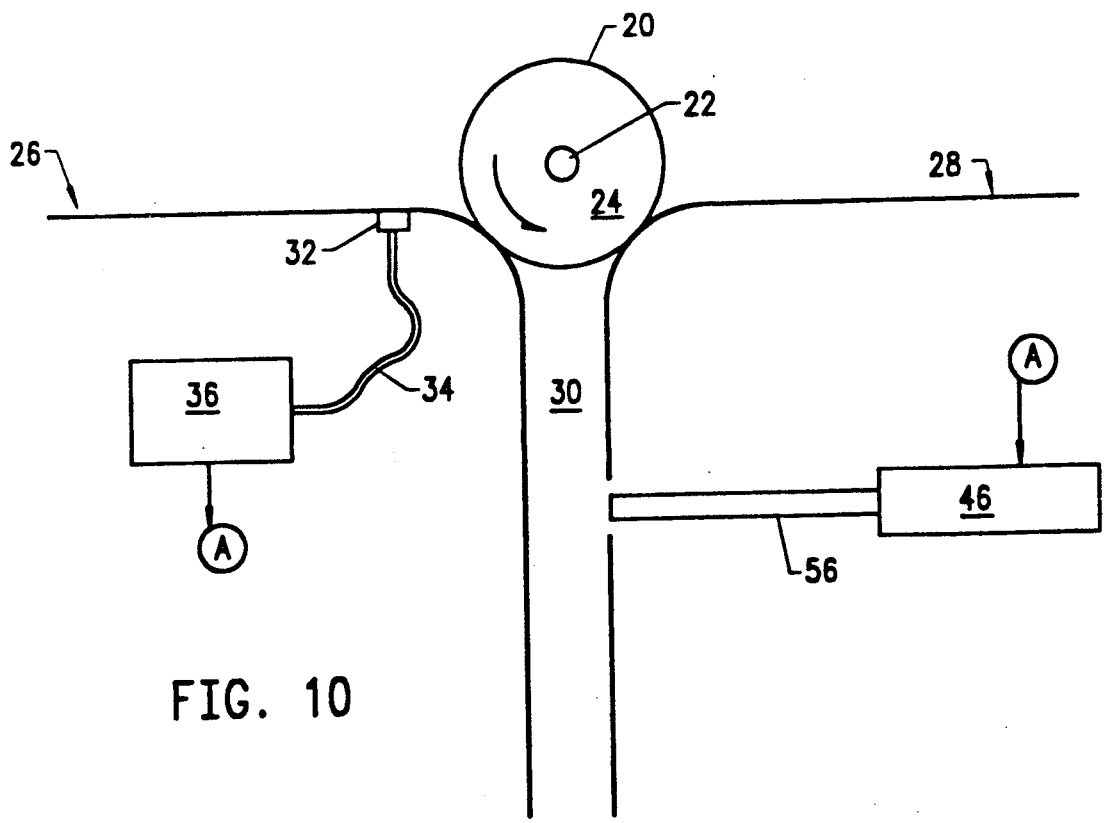
FIG. 10 shows a cross-section view of a second alternate embodiment of the present invention.

Certain circumstances do not require a secondary propeller 38. In such circumstances, some means are needed to stop the fabric. For example, in FIG. 10, an air cylinder piston 56 comes into contact with the fabric holding it in place against the opposite wall of the slot with sufficient friction to allow the primary propeller 20 to flip the workpiece from the input tray 26 to the output tray 28. The piston 56 is then retracted to allow the primary propeller 20 to remove the workpiece. This embodiment may be limited to certain configurations of fabric size and flexibility.

Figure 11:
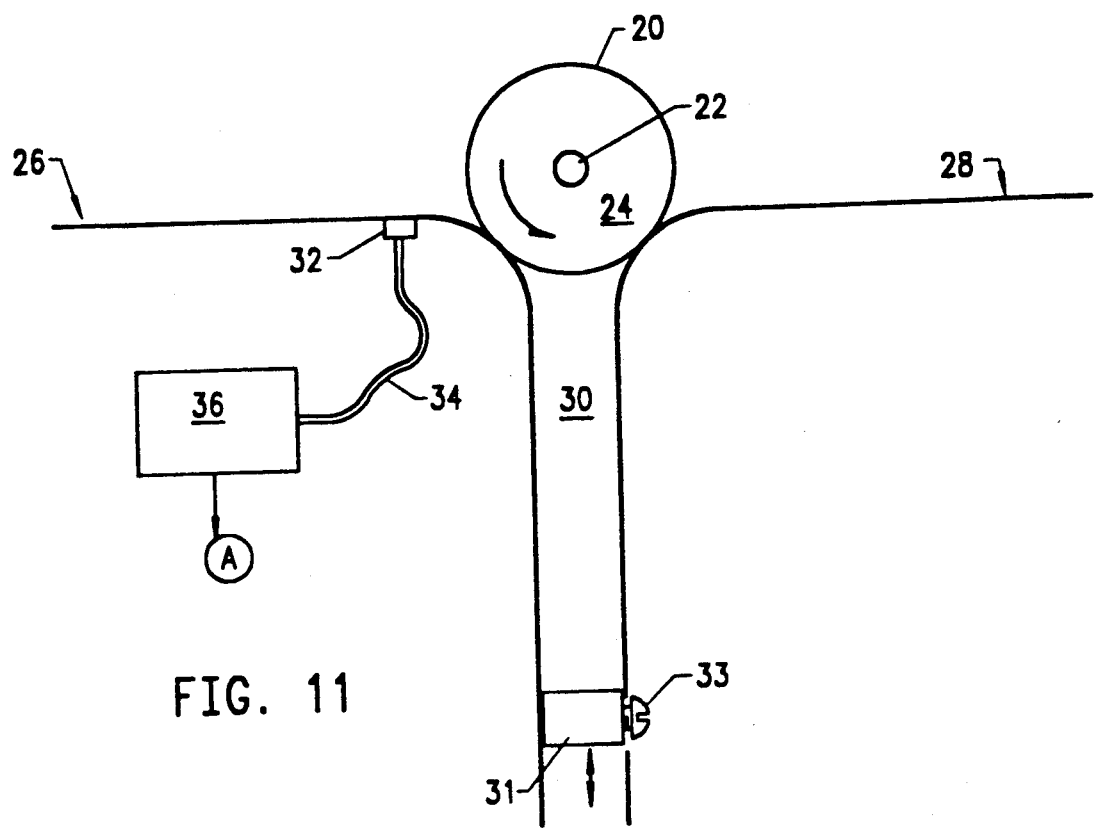
FIG. 11 shows a cross-section view of a third alternate embodiment of the present invention.

The advantage of the light sensor is that fabric of any length may be flipped over. However, if only one size of fabric is to be flipped, a specific apparatus can be built including a bottom stop 31 positioned at an appropriate position in the slot to prevent the fabric from disengaging the primary propeller as shown in FIG. 11. The bottom stop 31 can be adjusted for example by a screw 33 positioned in a channel in a side wall of slot 30 as appropriate of the workpiece.

Figure 12A:
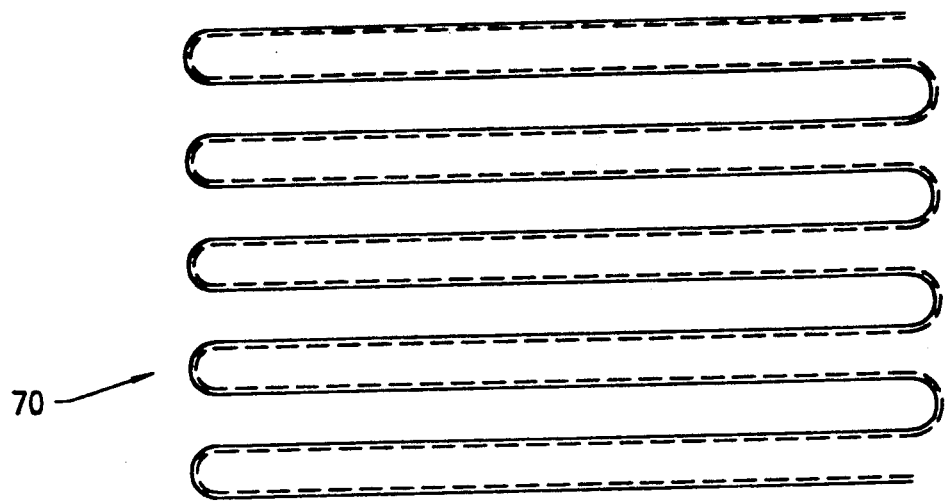
FIGS. 12A and 12B show cross-section views of possible workpieces utilized in connection with the present invention.
Figure 12B:
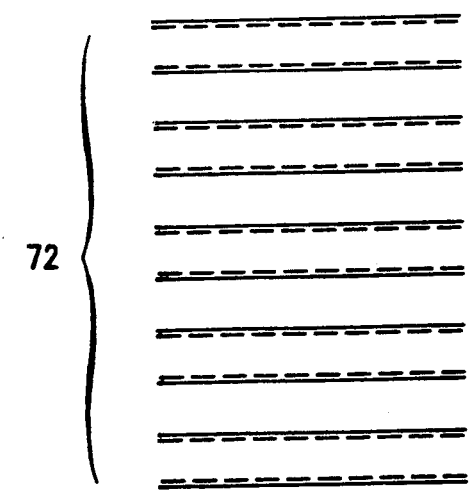

In certain circumstances, not every object should be flipped. For example, in the garment industry a bolt of fabric may be folded into a large accordion pleat 70 as shown in FIG. 12A. Ordinarily, such fabric has a good side and a bad side. After forming the pleat 70 a single cut is made to form a stack of workpieces 72 as shown in FIG. 12B. The workpieces in the stack 72 are alternately face up and face down. Prior to further processing, it is desirable to turn every other piece of fabric over so that each piece is oriented face up or face down. It is also desireable that all the workpieces traverse the same path.

Figure 13:
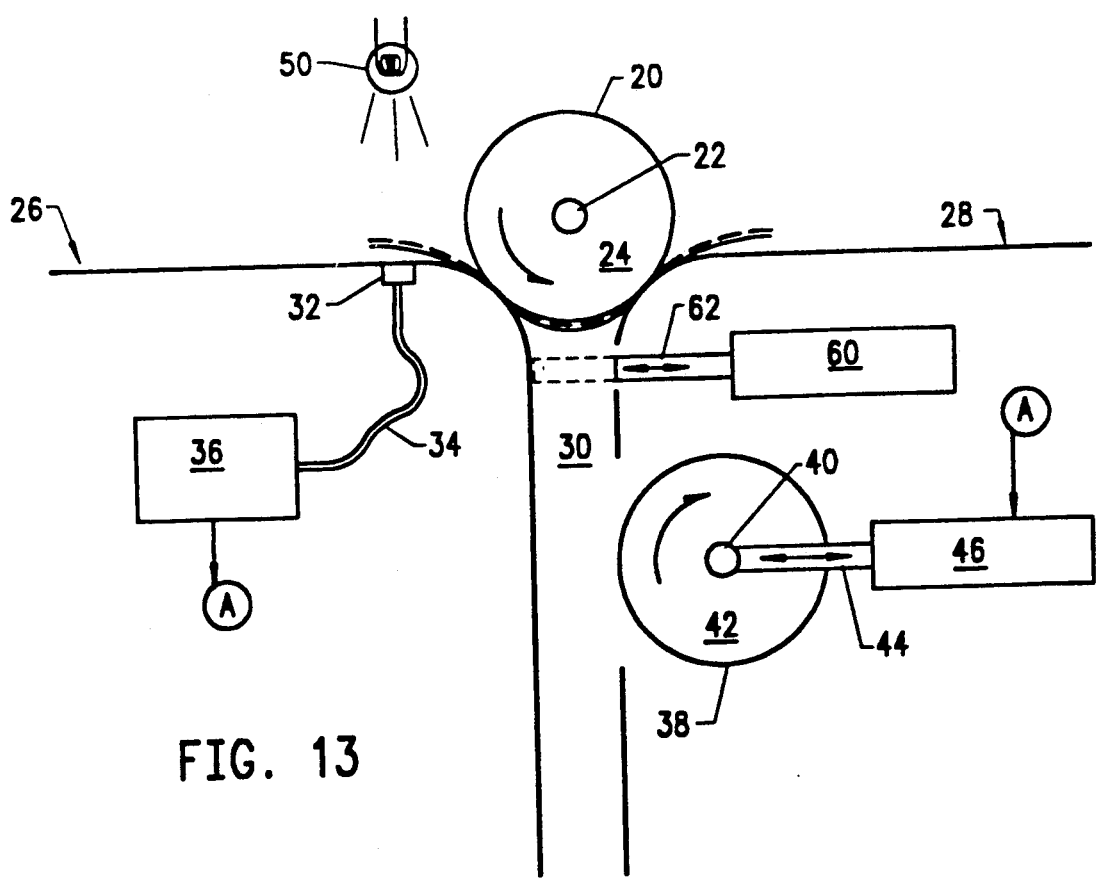
FIG. 13 shows a cross-section view of a fourth alternate embodiment of the present invention.

These goals are accomplished in the present invention with an air cylinder 60 as shown in FIG. 13. The shaft 62 of air cylinder 60 is extended across the top of the slot 30. The shaft 62 may have a plate or grate coupled to its distal end in order to more fully block the slot 30. A workpiece that is delivered to the apparatus after the air cylinder 60 is activated will be prevented from entering the slot 30. Instead, the workpiece will be drawn through the apparatus by the brush or roller 24 with its top to bottom orientation unchanged.

Because workpieces that are flipped travel a further distance than those that are not flipped, it is possible for consecutive workpieces to collide. Further, it may be desirable to have evenly timed workpiece delivery to downstream equipment that is independent of whether the workpiece was flipped or not. This is especially true for automatic equipment downstream of the fabric turner.

FIG. 14 shows a cross-section of the preferred embodiment of the present invention. The apparatus comprises an input tray 104. The input tray is coupled to receive a workpiece and provide it into the apparatus. A coacting pair of brushes or rollers 108 and 110 is positioned at the end of the input tray 104. An input arc member 246 is adjacent to and positioned to receive workpieces from the input tray 104. Coacting brushes or rollers 112 and 114 are positioned through an opening the input arc member 246.

A slot 160 is positioned directly below the roller or brush 112. The coacting rollers and brushes 118 and 120 are positioned near the top of the slot 160. The brush 118 is coupled to a pin 122 of the air cylinder 124. In this manner, the brush or roller 118 can be extended to contact the brush or roller 120. A second arc member 156 extends from the slot 160 away from the arc 246. The two arcs 246 and 156 and the walls of slot 160 form a shape somewhat similar to a Y. The coacting brushes 112 and 116 are positioned through an opening in the arc 156. The coacting brushes 126 and 128 are positioned at the upper end of the arc 156. The output tray 106 is adjacent to and positioned to receive workpieces from the arc 156.

Figure 23:
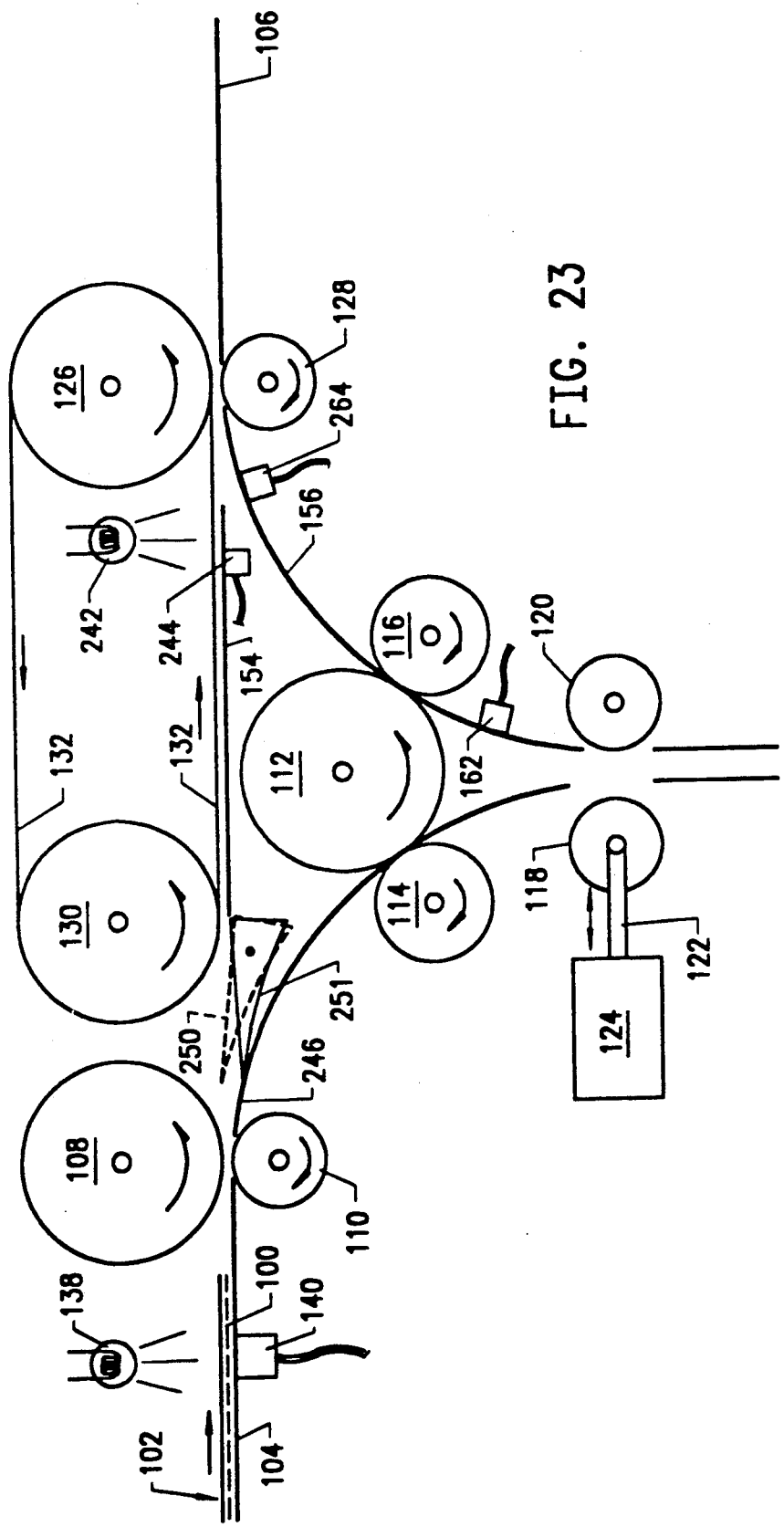

A horizontal tray 154 extends substantially across the top of the Y formed by arc 246, 156 and the walls of the slot 160 between the coacting brushes 108 and 110 to the coacting brushes 126 and 128. There is a gap between tray 154 and the coacting brushes 108 and 110 which gate 250 can bridge as shown in FIG. 23. A roller 130 is positioned at the opposite end of the horizontal tray 154 from the roller 126. The rollers 130 and 126 are coupled to one another by the belt 132 and accordingly rotate uniformly.

A light source 138 is positioned over the input tray 104 to illuminate a photo sensor 140 which is located within the input tray 104. Similarly, a light source 242 illuminates a photo cell 244 which is positioned near the downstream end of tray 154 and a photo cell 264 which is positioned near the top of the arc 156. The light sources 242 and 138 may in fact be a single light source.

FIGS. 14 through 22 shows the sequence of events which occur to flip a piece of fabric or other workpiece over within the apparatus of the preferred embodiment of the present invention. FIG. 14 shows a piece of fabric having a top surface 100 and bottom surface 102 and moving to the right along input tray 104. The piece of fabric is covering photo cell 140 thereby preventing the light from striking input tray 104. The input tray 104 can be, for example, a conveyor or other means for causing the fabric to traverse into the machine.

Figure 15:
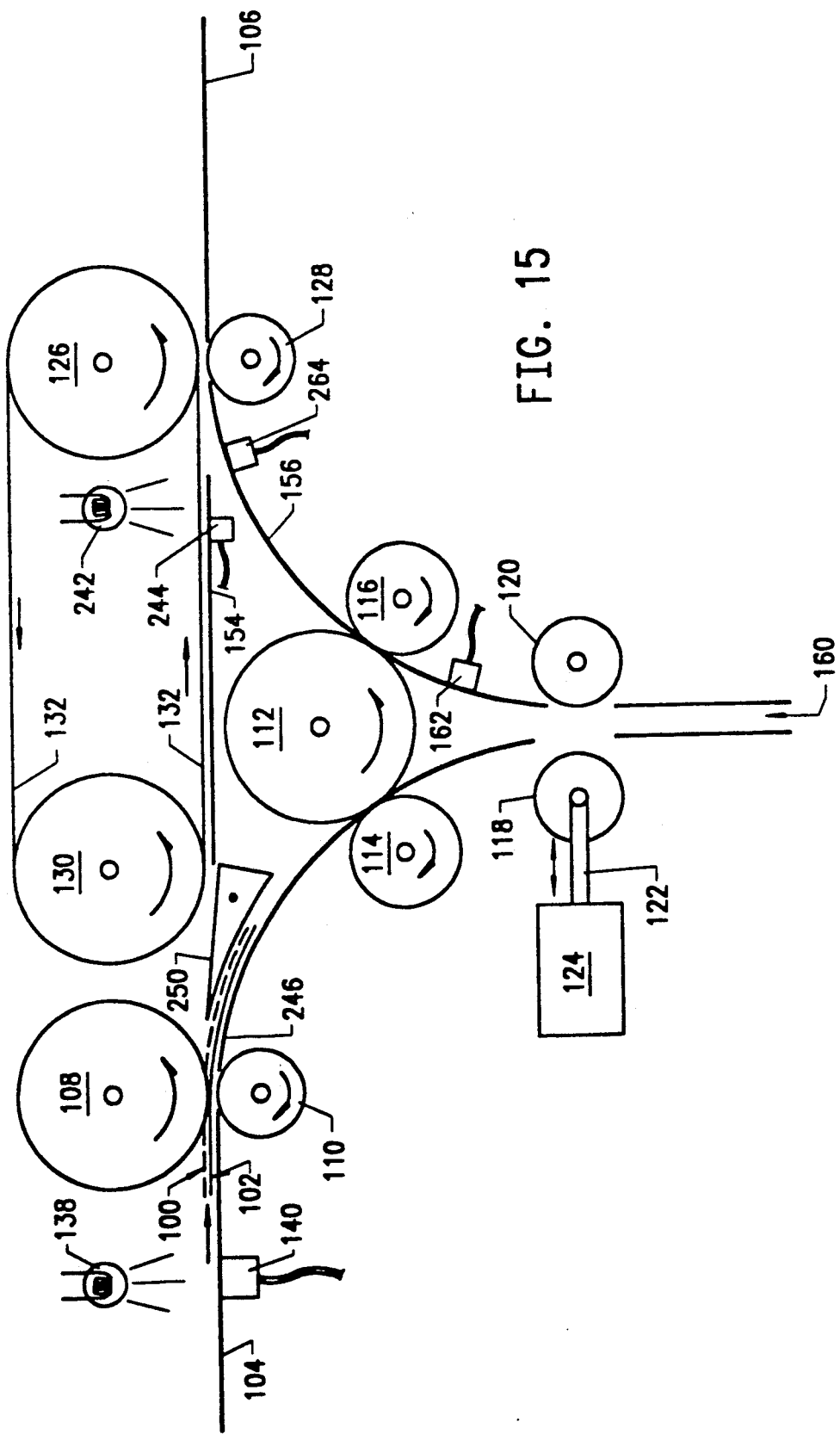

FIG. 15 shows that the fabric has been gripped by the coacting rollers 108 and 110; the roller 108 is rotating in a counterclockwise direction and roller 110 is rotating in a clockwise direction. The two rollers actually touch thereby gripping the fabric and propelling it into the apparatus. Due to the force of gravity, the piece of fabric will follow the input arc 246 downward.

Figure 16:
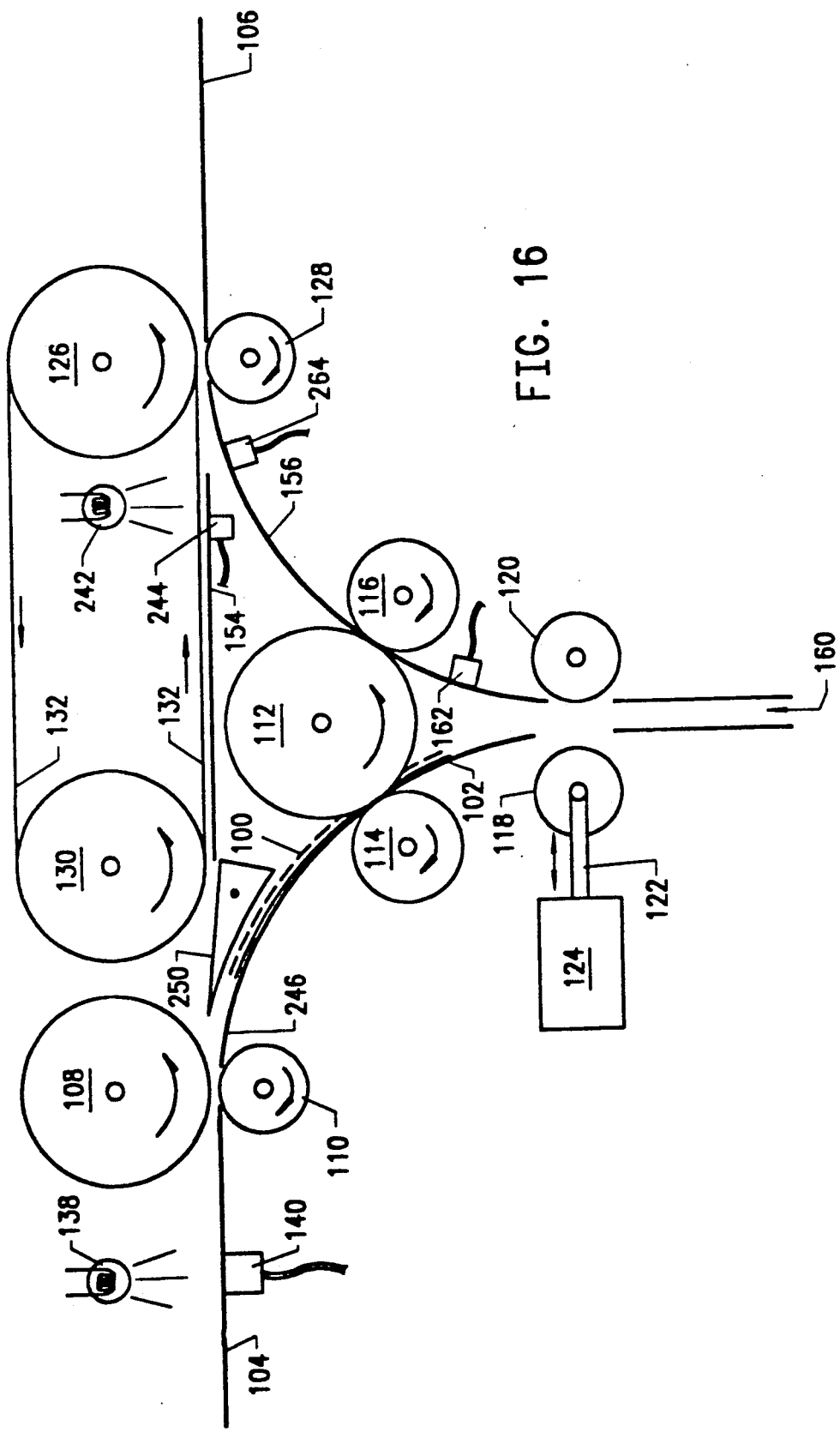

In FIG. 16, the piece of fabric has been gripped by the coacting rollers 112 and 114. Roller 112 is shown to rotate in a counterclockwise and roller 114 is shown to rotate in a clockwise direction. The coacting rollers 112 and 114 touch to pull and propel the fabric downward into the slot 160.

Figure 17:
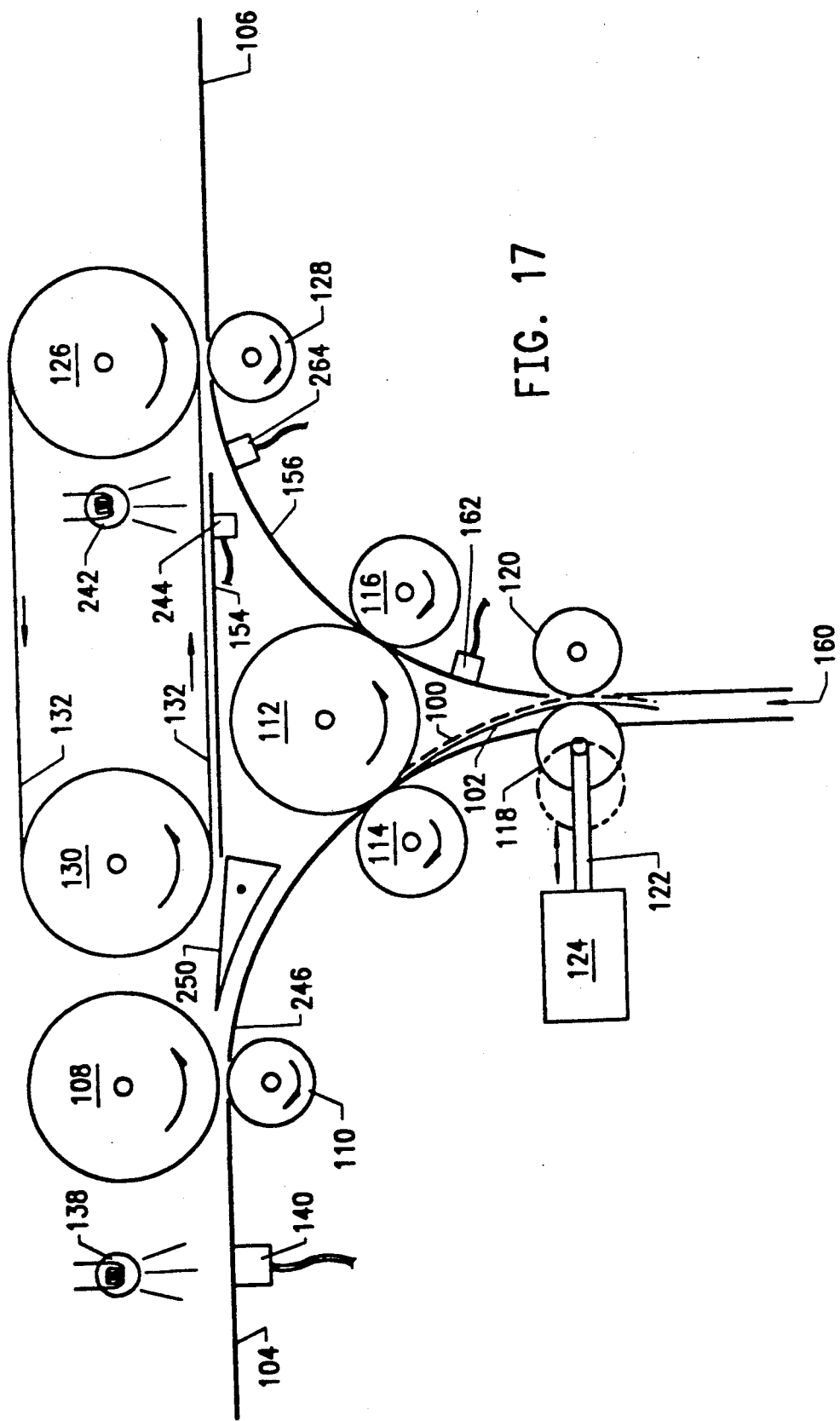

The piece of fabric has passed into the slot 160 and no longer covers the photo cell 140 which instructs the air cylinder 124 to extend its pin 122 to push the roller 118 into contact with roller 120 in FIG. 17. At this point in the operation, neither roller 118 nor roller 120 are rotating but, by touching together they prevent further motion of the fabric in a downward direction into the slot 160.

Figure 18:
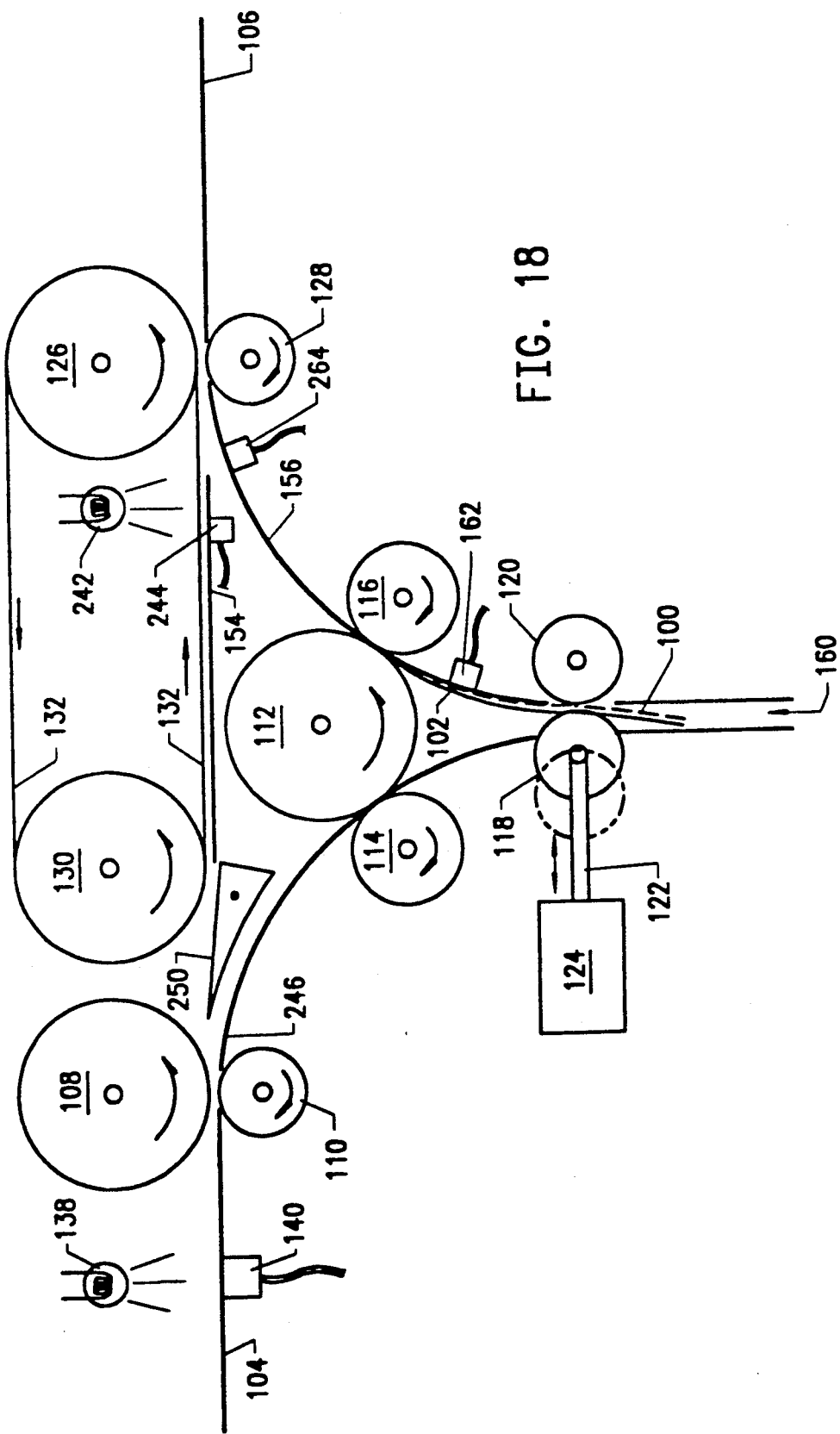

The workpiece has flipped from the input arc 152 to exit the arc 156 due to the rotational direction of roller 112 in FIG. 18. What was the trailing end of the workpiece is now the leading end of the workpiece and is positioned between the coacting rollers 112 and 116. The photo cell 162 is blocked from receiving light by the piece of fabric which indicates that the piece of fabric has flipped and is in the exit cycle and instructs the rollers 118 and 120 to rotate. The photo cell 162 can receive light from light source 138 or 242. In the alternative, a third light source may be positioned to illuminate the photo cell 162.

Figure 19:
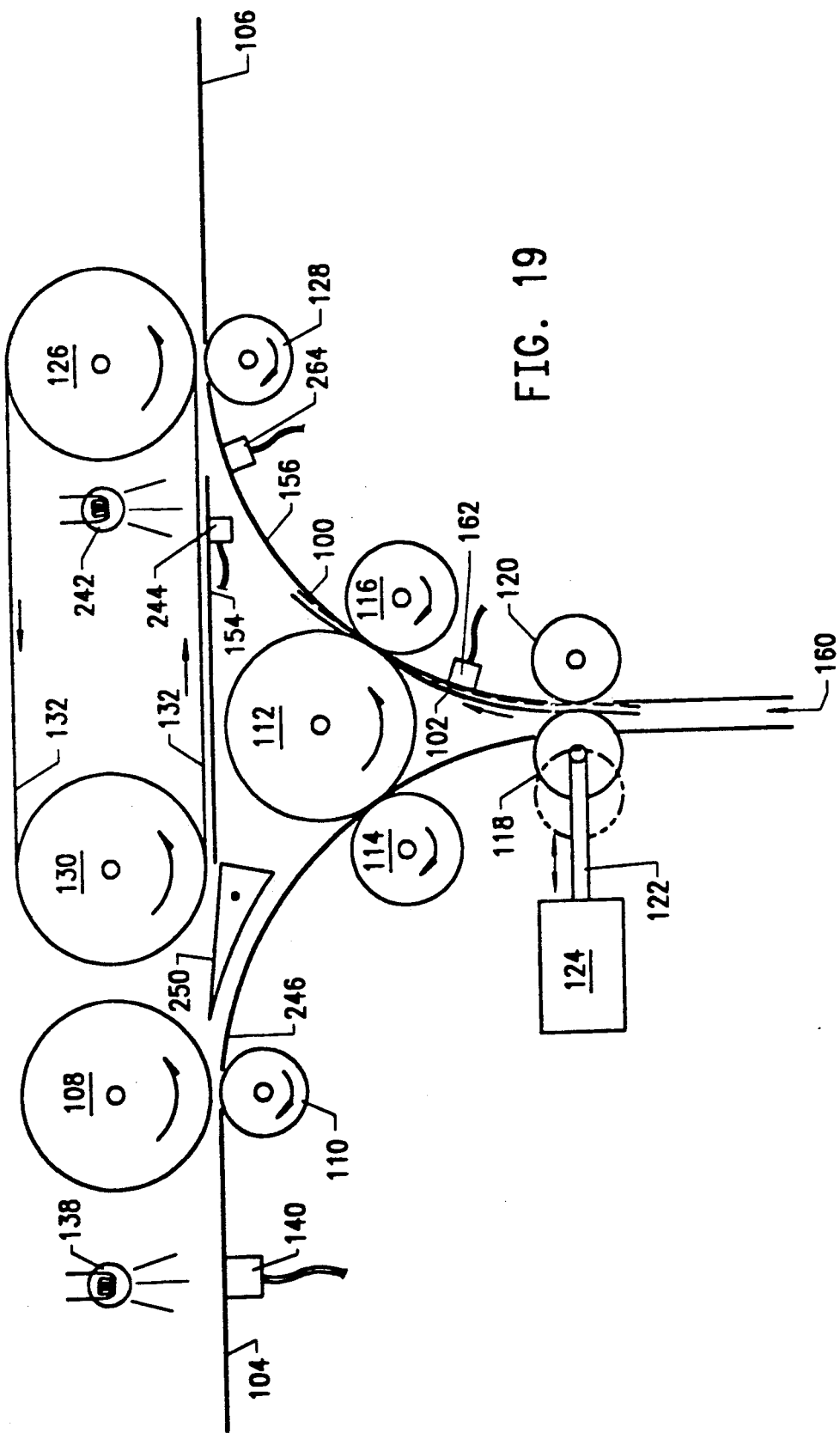

FIG. 19 shows that the coacting rollers 118 and 120 have begun to rotate; the roller 118 is rotating in a counterclockwise direction and the roller 120 is rotating in a clockwise direction. The coacting rollers 112 and 116 continue to rotate counterclockwise and clockwise respectively. The combination of the rotation of these four rollers 112, 116, 118 and 120 acts to pull the fabric out of the slot 160. At this point the top surface 100 of the fabric workpiece is against the exit arc 156. The fabric is still blocking light from impinging on the photo cell 162.

Figure 20:
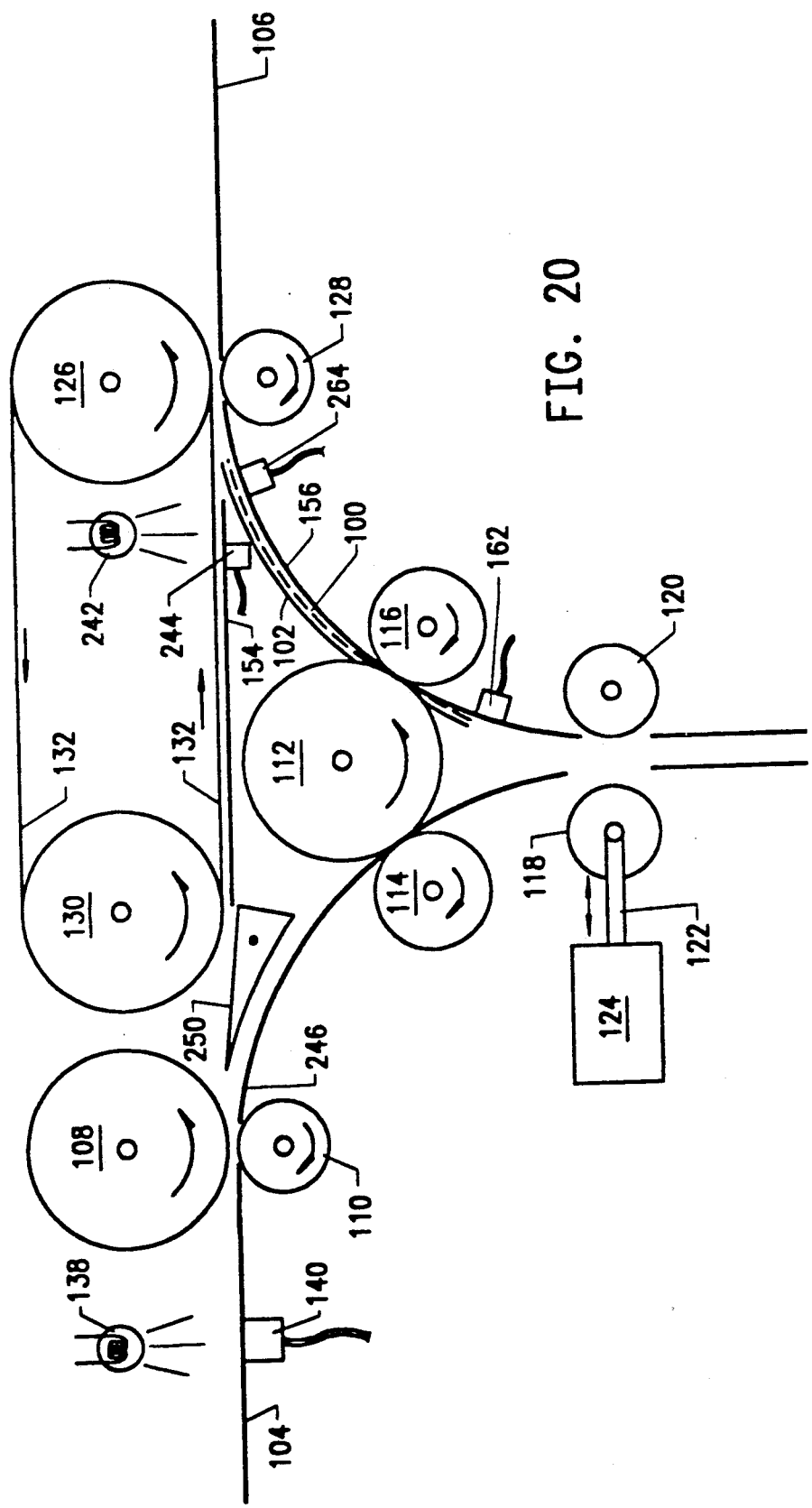

The fabric has passed beyond photo sensor 162 in FIG. 20 instructing the coacting rollers 118 and 120 to stop rotating and the air cylinder 124 and pin 122 to retract the roller 118 in preparation for the next workpiece. Also, the fabric blocks light from impinging on the photo cell 264 indicating that the workpiece is ready to exit the apparatus.

Figure 21:
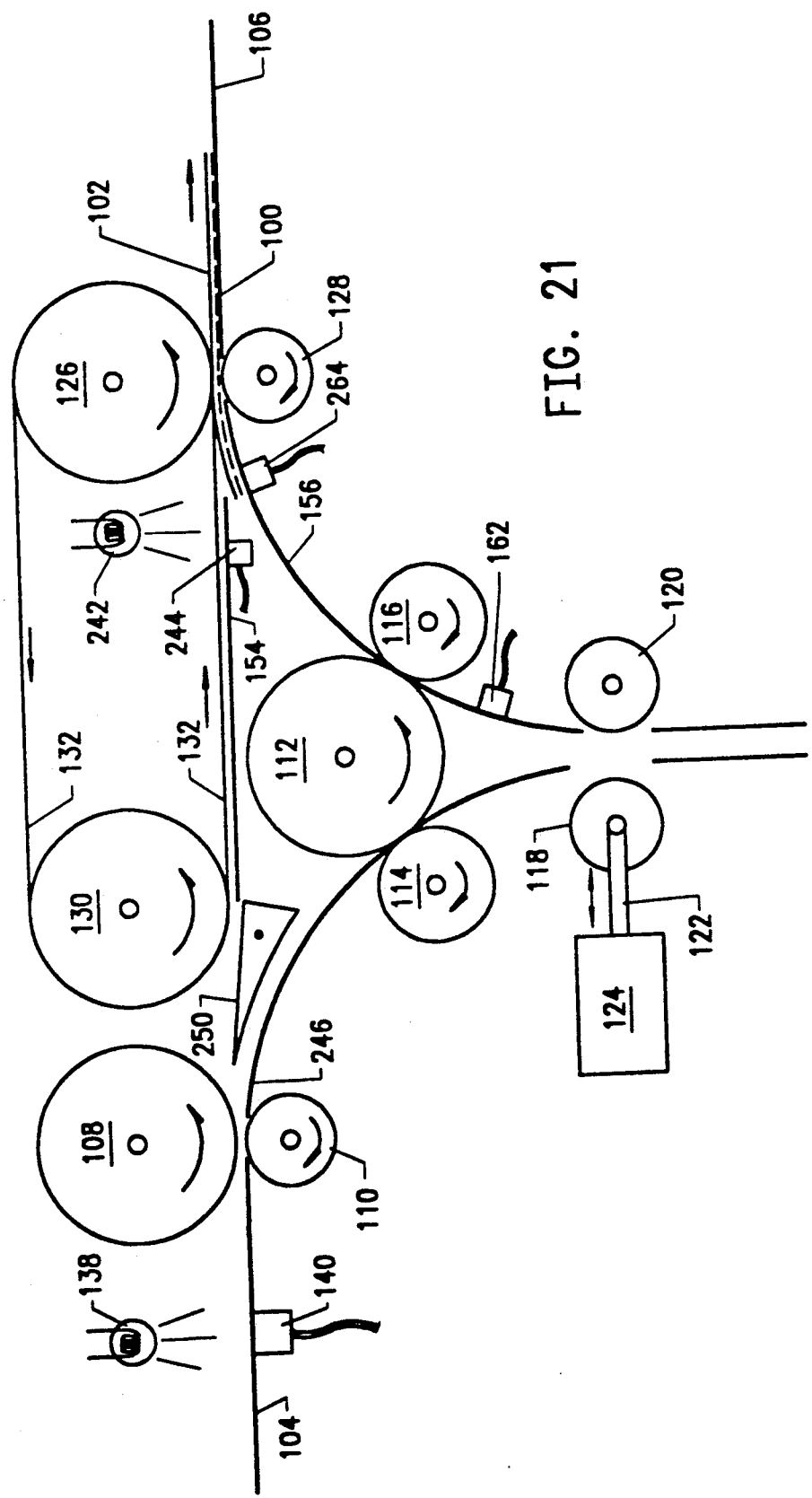

FIG. 21 shows that the rotation of the coacting rollers 126 and 128 operates to draw the workpiece out of the apparatus onto the output tray 106. The output tray 106 is preferably a conveyor.

Figure 22:
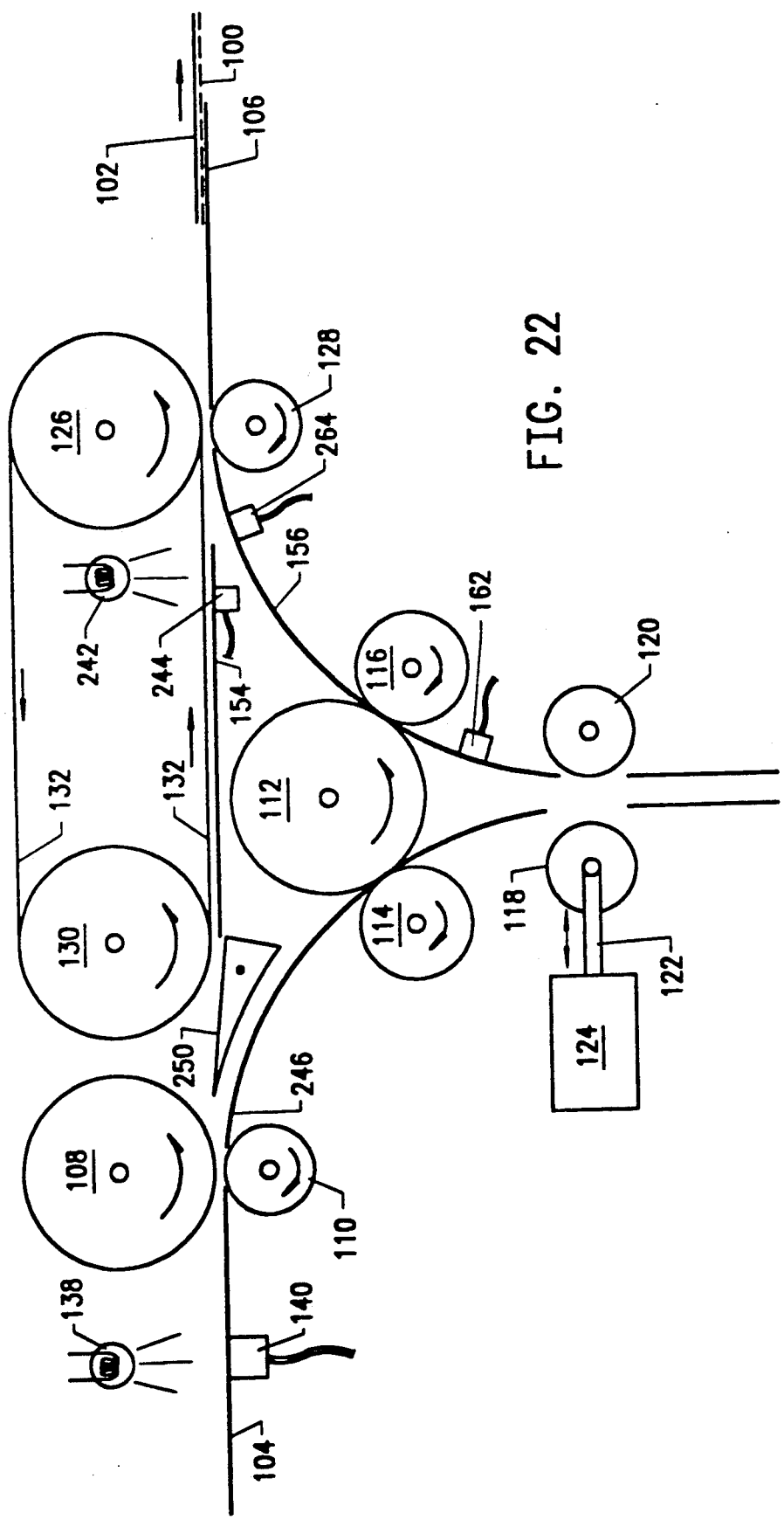

FIG. 22 shows the workpiece leaving the apparatus of the present invention. The photo sensor 264 is now uncovered to indicate that the workpiece has left the apparatus.

FIGS. 23 through 26 show the operation of the apparatus where the workpiece does not get flipped over. In FIG. 23, the workpiece enters the apparatus on input tray 104 as before except that the fabric is inverted from that shown in FIG. 14, i.e., the top of the workpiece 100 is on the bottom and the bottom of the workpiece 102 is on the top. The control mechanism for the gate 250 is activated moving the gate to its second non-flip position 251.

Figure 24:
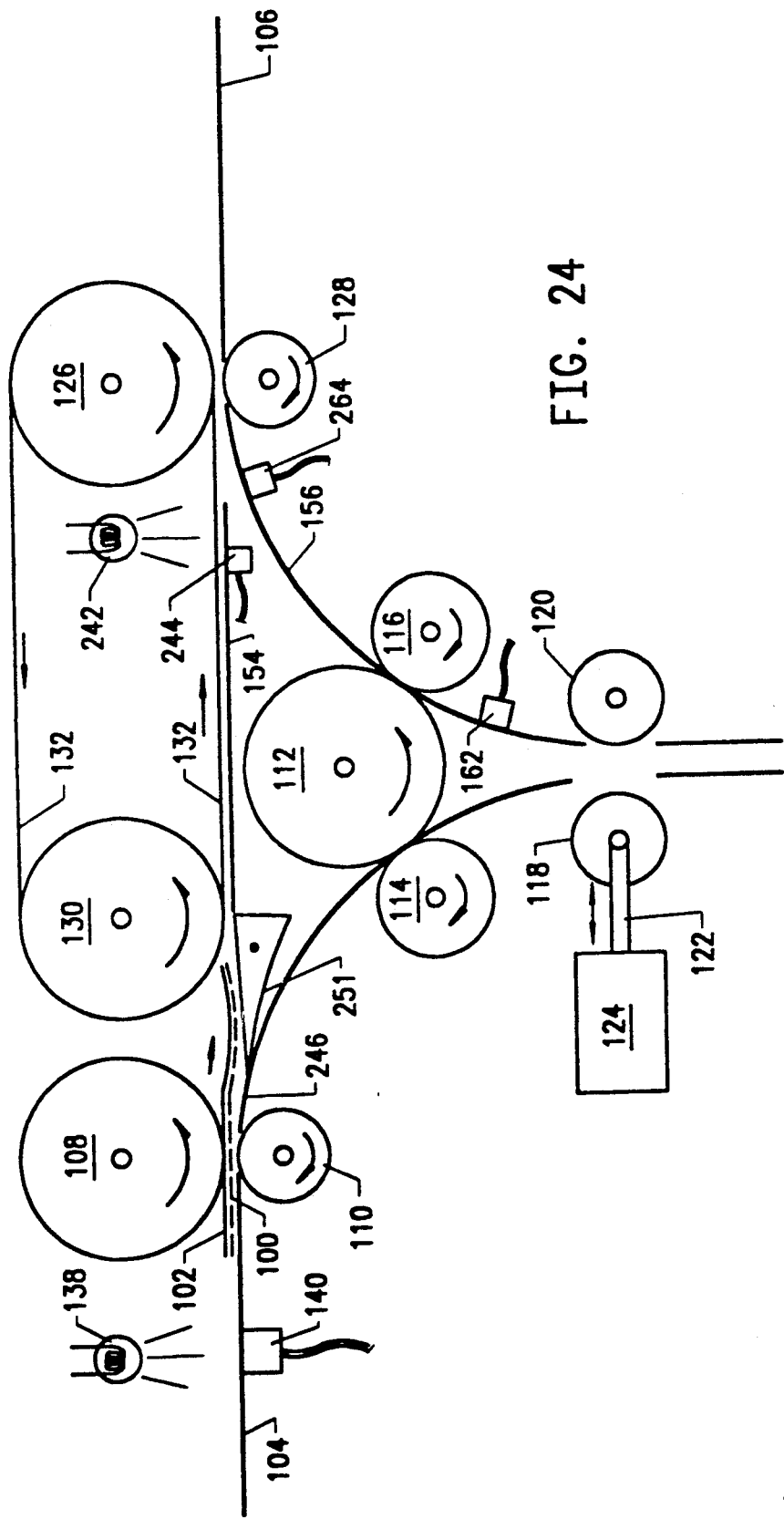

In FIG. 24 shows that the coacting rollers 108 and 110 have gripped the workpiece and propelled it into the apparatus on the arc 246 and onto the gate which is in the non-flip position 251.

Figure 25:
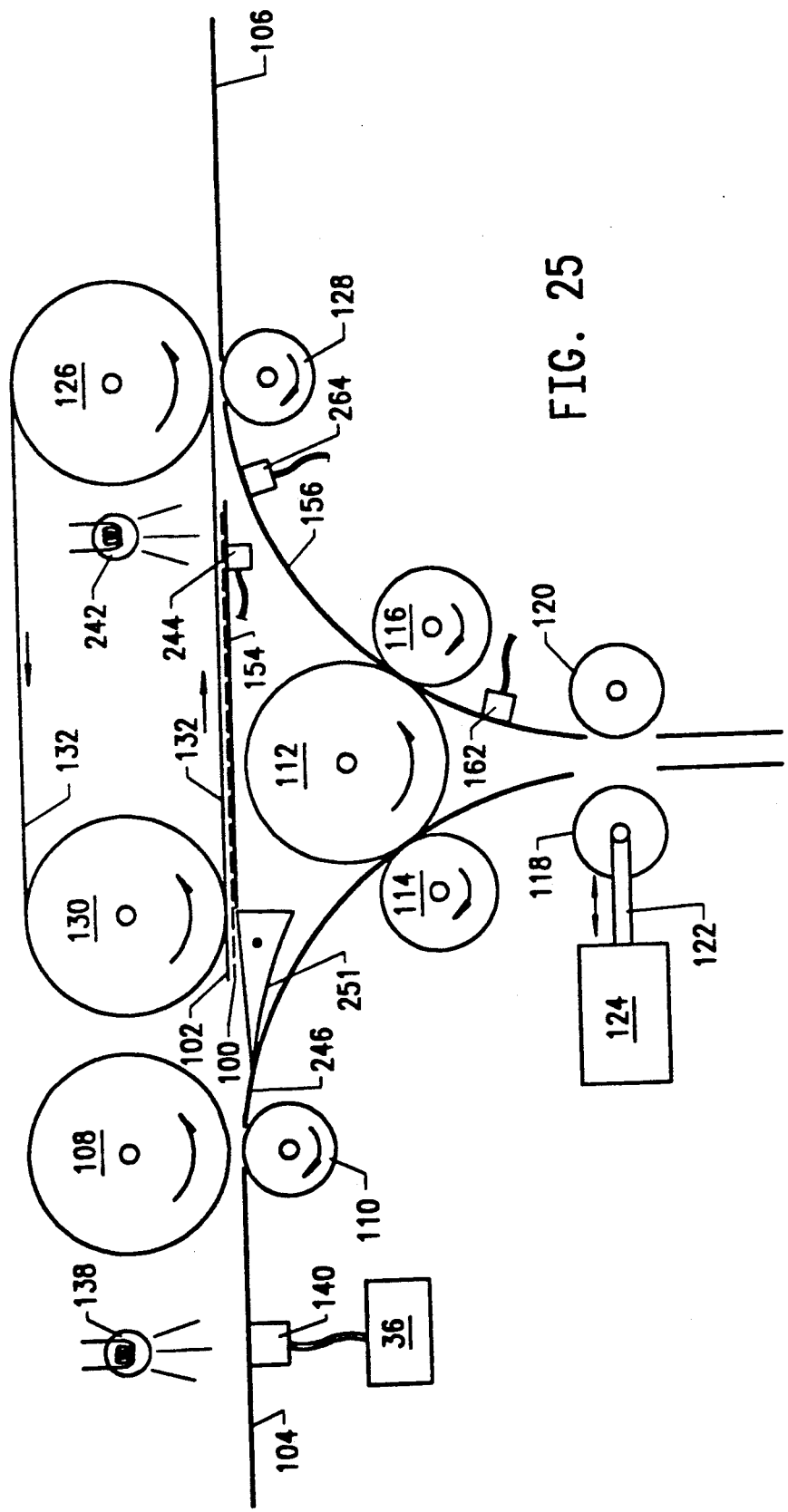

The workpiece is driven into contact with the belt 132 and is driven across the horizontal tray 154 by the belt 132 in FIG. 25. The belt 132 is driven by the rollers 126 and 130. As the workpiece approaches the downstream end of the tray 154 it blocks the photo cell 244 indicating that the workpiece is ready to exit the apparatus.

Figure 26:
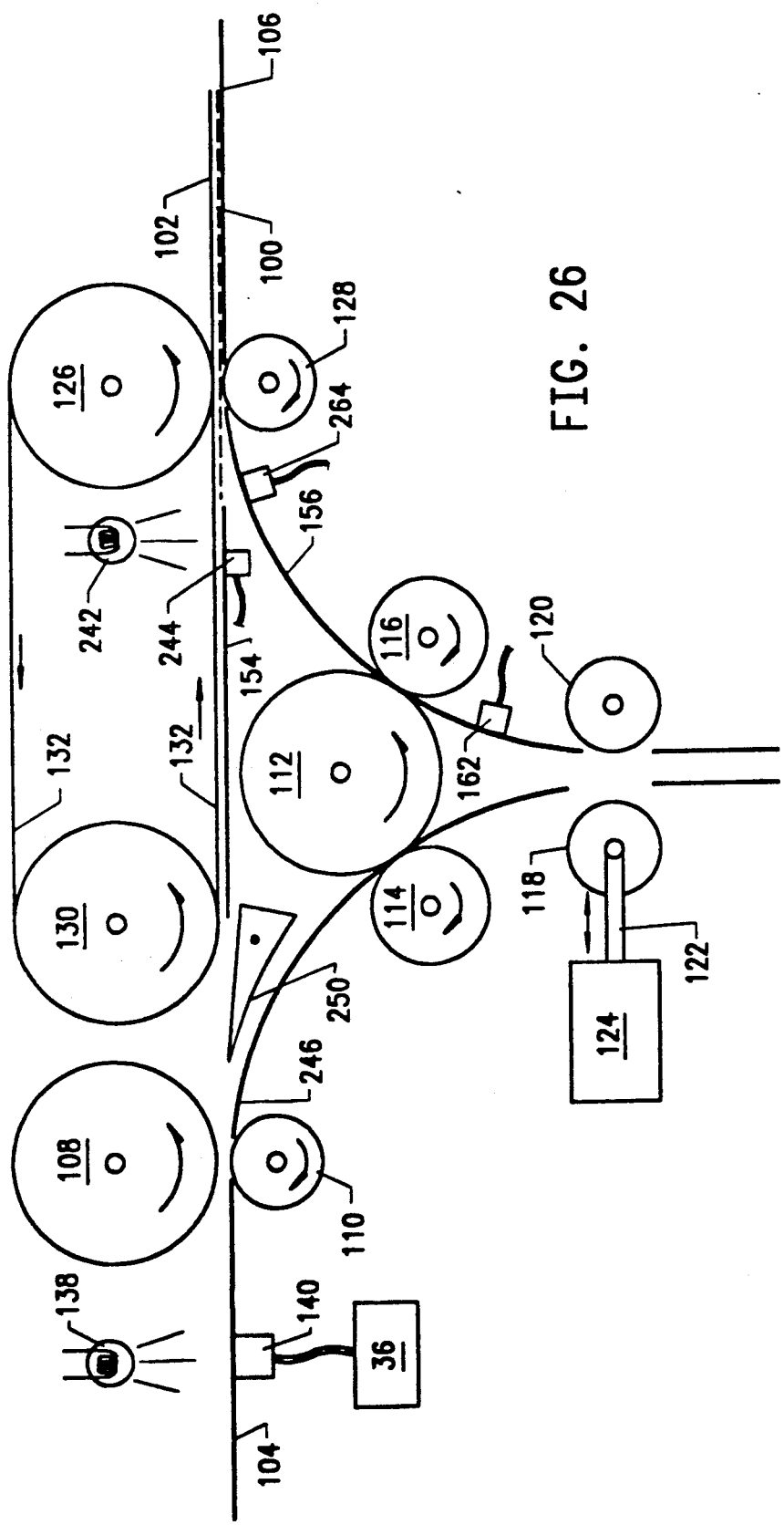

FIG. 26 shows the workpiece being propelled by the coacting rollers 126 and 128 onto upper tray 106. FIG. 22 also shows the last figure in this sequence. After the workpiece clears the photo sensor 244, the gate returns to the flip position 250 in preparation for the next workpiece.

The two photo cells 244 and 264 act cooperatively to prevent collisions of flipped and non-flipped workpieces. The electronic control apparatus 36 receives signals from each of the photo cells 140, 162, 244 and 264. Because the flipped and non-flipped workpieces travel different distances it is important to control when they are allowed to leave the apparatus. The rollers 112, 114, 116, 118 and 120 are driven faster than the remaining rollers but precise timing is difficult to achieve with such mechanical systems. In addition, rollers 108 and 110 can be clutched to high speed during a flip cycle. A flipped workpiece is stopped as it blocks the photo cell 264 because that cell instructs the rollers 112, 116, 118 and 120 to stop until downstream equipment needs that workpiece. A non-flipped workpiece can traverse through the apparatus at the same speed required by downstream equipment. Further, the flipped workpiece cannot begin moving again until the photo cell 244 tells the electronic control 36 that the non-flipped workpiece is clear.

An apparatus for flipping over flexible limp planar objects is disclosed. Although the present invention has been shown and described with respect to preferred embodiments, various changes and modifications which, after reading this disclosure, may be apparent to a person skilled in the art to which the invention pertains are deemed to lie within the spirit and scope of the invention.

What is claimed is:

1. An apparatus for selectively inverting a fabric workpiece which has a first face, a second face, a leading edge and a trailing edge comprising:
    a) input means for accepting the workpiece into the apparatus, with the first face facing up;
    b) a non-inverting path coupled to receive the workpiece from the input means for transporting the workpiece through the apparatus so that the first face remains facing up;

c) an inverting path coupled to receive the workpiece from the input means for transporting the workpiece through the apparatus so that the first face faces down, the inverting path including:
   1) a pair of spaced apart walls which are substantially vertical and parallel and define an inversion slot having an opening to receive the workpiece at its upper end;
   2) a primary workpiece propeller for drawing the workpiece by its leading edge into the slot and for removing the workpiece by its trailing edge from the slot; and
   3) means for stopping the workpiece at a selected location within the slot so that the trailing edge of the workpiece remains in contact with the primary workpiece propeller;

d) first control means coupled to the input means, the non-inverting path and the inverting path for directing the workpiece to one or the other of the non-inverting path or the inverting path; and e) second control means coupled to the non-inverting path and the inverting path for instructing the workpiece to exit from the apparatus.

2. The apparatus according to claim 1 wherein the inverting path is longer than the non-inverting path.

3. The apparatus according to claim 2 further comprising means for accelerating the workpiece through the inverting path.

4. The apparatus according to claim 1 wherein the first control means comprises a pivotable gate member.

5. The apparatus according to claim 1, wherein the second control means comprises a first workpiece sensor in the inverting path and a second workpiece sensor in the non-inverting path.

6. The apparatus according to claim 4 wherein the first workpiece sensor and the second workpiece sensor each comprise a photo cell.

7. The apparatus according to claim 4 wherein the second control means further comprises a control circuit.

8. The apparatus according to claim 6 wherein the second control means further includes means for preventing collisions between workpieces.

9. An apparatus for selectively inverting a limp fabric workpiece having a top surface, a bottom surface, a leading edge and a trailing edge, the apparatus comprising:

a) an input means comprising a first pair of coacting rollers for receiving the leading edge and propelling the workpiece downstream;

b) a first path having a downstream direction for inverting the workpiece, comprising:
   1) a second pair of coacting rollers downstream of the input means for receiving the leading edge and propelling the workpiece downstream, wherein one of the second pair of coacting rollers is a primary inversion propeller;
   2) a pair of substantially vertical walls spaced apart from one another forming an inversion slot therebetween positioned downstream of and below the second pair of coacting rollers for receiving the workpiece therefrom;
   3) means for stopping the workpiece at a selected location within the slot so that the trailing edge of the workpiece is in contact with the primary inversion propeller;
   4) a third pair of coacting rollers downstream of the slot for receiving the trailing edge and withdrawing the workpiece from the slot, wherein one of the third pair of coacting rollers is the primary inversion propeller; and
   5) a fourth pair of coacting rollers downstream of the third pair of coacting rollers for receiving the workpiece and propelling downstream;

c) a second path having a downstream direction for passing the workpiece through the apparatus without inverting, comprising:
   1) a diverter gate having a non-inverting position located downstream of the first pair of coacting rollers and upstream of the second pair of coacting rollers for diverting the workpiece away from the first path;
   2) transfer means downstream of the diverter gate for receiving the workpiece from the gate in the non-inverting position and propelling it downstream to the fourth pair of coacting rollers; and d) control means coupled to the first path and the second path for instructing the workpiece to exit from the apparatus.

10. The apparatus according to claim 9 wherein the means for stopping comprises means for monitoring the position of the trailing edge of the workpiece relative to the slot and for generating a control signal to stop the progress of the workpiece so that the trailing edge remains in contact with the primary inversion propeller.

11. The apparatus according to claim 10 wherein the means for stopping comprises a fifth pair of coacting rollers including a moveable roller which is movable between an extended position for stopping the progress of the workpiece into the slot and a retracted position for allowing the workpiece to move in the slot.

12. The apparatus according to claim 11 wherein the fifth pair of coacting rollers are driven in response to the control signal.

13. The apparatus according to claim 9 wherein the inverting path is longer than the non-inverting path.

14. The apparatus according to claim 13 further comprising means for accelerating the workpiece through the inverting path.

15. The apparatus according to claim 14 wherein the control means comprises a first workpiece sensor in the first path and a second workpiece sensor in the second path.

16. The apparatus according to claim 15 wherein the first workpiece sensor and the second workpiece sensor each comprise a photo cell.

17. The apparatus according to claim 15 wherein the control means further comprises a control circuit.

18. The apparatus according to claim 17 wherein the control means further includes means for preventing collisions between workpieces.

* * * * *

UNITED STATES PATENT AND TRADEMARK OFFICE
CERTIFICATE OF CORRECTION

PATENT NO. : 5,106,075
DATED : April 21, 1992
INVENTOR(S) : Lawrence Wafford, Richard L. Harrington, Hubert Blessing, Ted M. Ray It is certified that error appears in the above-identified patent and that said Letters Patent is hereby corrected as shown below:

Col. 1, line 4 & 5 delete "U.S. Patent application Ser. No. 333 702 now" should read --Ser. No. 333,702 filed 4-4-89 now U.S. Patent No. 4,968,021--.

In Column 1, Line 26 delete "camming" and replace with -- jamming --.

In Column 6, Line 16, delete "In".

Signed and Sealed this

Twenty-sixth Day of October, 1993

Attest:

BRUCE LEHMAN

Attesting Officer

Commissioner of Patents and Trademarks